(12) United States Patent
Afful

(10) Patent No.: US 12,365,461 B2
(45) Date of Patent: Jul. 22, 2025

(54) PALLET HOLD-DOWN SYSTEM AND METHOD THEREOF

(71) Applicant: Matt Afful, Edmonds, WA (US)

(72) Inventor: Matt Afful, Edmonds, WA (US)

( * ) Notice: Subject to any disclaimer, the term of this patent is extended or adjusted under 35 U.S.C. 154(b) by 903 days.

(21) Appl. No.: 17/347,326

(22) Filed: Jun. 14, 2021

(65) Prior Publication Data

US 2021/0387727 A1     Dec. 16, 2021

Related U.S. Application Data

(60) Provisional application No. 63/038,341, filed on Jun. 12, 2020.

(51) Int. Cl.
*B64D 9/00* (2006.01)
*B60P 7/10* (2006.01)
*B60P 7/13* (2006.01)
*B64D 11/06* (2006.01)

(52) U.S. Cl.
CPC ............... *B64D 9/003* (2013.01); *B60P 7/10* (2013.01); *B60P 7/13* (2013.01); *B64D 11/0696* (2013.01)

(58) Field of Classification Search
CPC ....... B64D 9/003; B64D 11/0696; B60P 7/10; B60P 7/13; B64C 1/20
USPC ..... 410/80, 77, 78, 79, 69, 86, 46; 414/536; 244/118.1, 137.1
See application file for complete search history.

(56) References Cited

U.S. PATENT DOCUMENTS

| | | | | |
|---|---|---|---|---|
| 1,252,810 | A * | 1/1918 | Kirchner | B60P 7/13 220/1.5 |
| 4,138,950 | A * | 2/1979 | Mooney | B60P 7/10 410/104 |
| 6,315,141 | B1 * | 11/2001 | Brennan, Jr. | B64D 9/003 410/80 |
| 6,485,239 | B2 * | 11/2002 | Afful | B64D 9/003 410/86 |
| 6,695,554 | B2 * | 2/2004 | Afful | B64D 9/003 410/80 |
| 7,731,460 | B2 * | 6/2010 | Brown | B60P 7/13 410/80 |
| 11,352,137 | B2 * | 6/2022 | de Melo | B64D 37/04 |
| 11,383,837 | B2 * | 7/2022 | Larson | B64D 9/003 |
| 2013/0334367 | A1 * | 12/2013 | Larson | B60P 7/08 244/118.1 |

FOREIGN PATENT DOCUMENTS

| | | | | |
|---|---|---|---|---|
| DE | 102010006963 B4 * | 8/2014 | ............ | B64D 9/003 |
| GB | 2440064 A * | 1/2008 | ............ | B60P 7/0815 |
| KR | 20150027218 A * | 3/2015 | | |

* cited by examiner

*Primary Examiner* — Hilary L Gutman
(74) *Attorney, Agent, or Firm* — Apex Juris, pllc; Tracy M Heims

(57) ABSTRACT

A pallet hold-down system having a horizontal and vertical movement securement apparatuses and a method of using the system where a rotatable member is interconnected with a vertical and a horizontal movement securement apparatus such that rotation of the rotatable member simultaneously locks both the vertical and horizontal movement securement apparatuses to prevent horizontal and vertical pallet movements.

15 Claims, 12 Drawing Sheets

PALLET HOLD-DOWN SYSTEM AND METHOD THEREOF

SUMMARY

A seat, cargo, pallet hold-down system to quickly restrain and un-restrain side, vertical, horizontal, forward or rearward movement of transportation cargo and passenger seats pallets of even or uneven shapes and various sizes. The pallet hold-down system employs a horizontal movement securement apparatus and a vertical movement securement apparatus. The vertical movement securement apparatus has at least a pair of parallel securement members securable to a base, and a plurality of lockable pallet securement apparatuses affixed to the securement members. Each of the plurality of lockable pallet securement apparatuses has at least one pallet alignment member to facilitate pallet movement and positioning, at least one adjustable pallet engagement member that can adjust for pallet thicknesses, and a locking mechanism to lock and prevent movement of the at least one pallet engagement member. The horizontal movement securement apparatus has a rotatable member and at least one stopping member affixed to at least one end of the rotatable member, where the at least one stopping member is rotatable into a stopping condition to prevent horizontal pallet movement. The rotatable member is interconnected with the vertical movement securement apparatus and the horizontal movement securement apparatus such that rotation of the rotatable member simultaneously locks both the vertical movement securement apparatus and the horizontal movement securement apparatus. A pallet having outboard edges is inserted in between the pair of parallel securement members with the outboard edges placed under a first end of at least one adjustable pallet engagement member, urging the at least one adjustable pallet engagement member to rotate to accommodate distortions of the outboard edges. Once the pallet is fully inserted, the rotatable member is rotated to stop using the at least one stopping member, which in turn causes the rotatable member to engage with the locking mechanism of each of the plurality of lockable pallet securement apparatuses. The locking mechanism locks and prevents movement of the at least one adjustable pallet engagement member. The first end of the at least one adjustable pallet engagement member engages the upper surface of the pallet, restraining the vertical movement of the pallet when in locked condition. The at least one stopping member is affixed to an end of the rotatable member and, when rotated into a stopping condition, prevents horizontal pallet movement. Various embodiments of this pallet-hold down system are claimed and described.

A method for using the pallet hold-down system to secure at least one pallet is also provided. The method for using the pallet hold-down system can be applied on an airplane bay and at least one smaller pallet can be loaded using an airplane side door.

DESCRIPTION OF THE PRIOR ART

Field of the Invention

Typically, airline passengers are loaded through an entry door into the main deck cabin, while cargo is carried below the main deck in the belly. The need to carry large, wide, long and heavy cargo has necessitated dedicated cargo planes that have a large cargo door and reinforced fuselage structure.

Aircraft are used to carry passengers and a wide variety of cargo, from automobiles to military equipment to standard palletized cargo. Typically, for common aircraft carrying cargo, the cargo is usually palletized onto standard wooden or plastic pallets and then these pallets are loaded and properly positioned on standardized air cargo flat pallets and standardized container bases. These flat pallets are large and are able to carry numerous wooden pallets, along with a variety of other products, as noted above. The pallets used for cargo are generally large and are quite wide and long in order to accommodate heavy cargo which is carried below the main deck in the belly of the plane. Alternatively, passengers are loaded onto the craft through a smaller entry door leading into the main deck cabin. Currently it is impossible to load heavy cargo through these main cabin doors and it is impossible to properly secure cargo, especially heavy cargo, in the main cabin passenger area.

The present invention relates generally to systems to restrain cargo within any transportation. However, the present invention relates especially to airplanes and more specifically to cargo hold-down devices used to lock both standard and nonstandard cargo and currently nonstandard container pallets in place within the aircraft. With greater particularity, this invention relates to pallet hold down systems that accommodate either flat or defective, distorted cargo pallets or cargo containers. This invention relates to container pallets that are shorter and generally smaller than typical, standard cargo pallets. Cargo pallets and cargo containers used in the aircraft industry must conform to government issued standards and regulations. This invention, therefore, also relates to the compliance of cargo pallet and cargo container to these regulations along with those that are currently being developed that are not yet standardized. This would include smaller pallets that can be interconnected or locked together in order to form a pallet that is dimensioned similarly to a full-sized pallet. Cargo pallet and cargo container are terms used herein interchangeably. This invention also relates to an apparatus, a method and a system to load cargo, including palletized cargo, including palletized seats, through the main cabin entry doors and to properly secure that cargo once inside the cargo bay.

Description of the Related Art

Governmental regulations and rules require cargo to be loaded and constrained in aircraft using regulated standard pallet and container bases in order to facilitate safety, cargo movement, handling, storage, and convenience. The container bases are sized to fit within a designated area or a cargo bay inside an aircraft according to size and weight distribution allowances and aircraft design.

Regulations and rules require that the palletized bases be restrained in their bay from vertical, side and forward movements. Most existing containers used for transportation must meet certification standards for load capacities and positive side vertical restrains. For this purpose, a standard pallet base has hold-down areas or strips extending horizontally from the outboard edges and sides at the bottom of the base with strap slots used for restraining purposes. Vertically restraining the upward motion of the pallets at these side edges is important, because the reaction loads of locked pallets must distribute the forces within the adjacent floor beams of the aircraft. Existing pallets and containers without side vertical restraints are restrained for vertical up-gust loads only by the end latches. This configuration transfers vertical up-gust loads on the closest floor beams at the ends of the pallets and containers which under some circumstances, can exceed maximum tolerances leading to failure. Moreover, existing pallets and containers without side vertical restrains are restrained for vertical couple arising from forward-aft loads only by the end latches. Hence, all vertical kick loads in crash conditions are transferred through the end latches to the closest floor beams, leading in most cases to over-loading and failure. It is therefore necessary in the present art to have a bulkhead or barrier with sufficient strength to restrain the cargo in a crash condition.

In each bay, horizontal lipped slots near the base of the bay provide vertical restrain means. These receive standard outboard edges of the pallet to constrain upward pallet movement within the bay. These lipped slots presume the size and shape of the pallet outboard edges to be straight and within the tolerance specified by industry standards as a receiving gap for the pallet. Previously, both the side lipped slots and pallet outboard edges had to be within 0.25 of an inch of flat to ensure positive vertical contact necessary to restrain the pallet from vertical motion and to enable the outboard edges to slide within the lipped slots as the pallet is secured. Now, the industry wide requirement for system compliance to accommodate pallet distortion is up to 1.75". This is much larger than previously specified and the invention described herein accommodates this now recognized pallet distortion dimension but also allows for more vertical motion of the pallets and opens the door for problems caused by this motion.

Applicant's previous patents U.S. Pat. Nos. 6,485,239 and 6,695,554 attempted to resolve some of these issues. In the prior art, the hold-down device for air cargo pallets shown generally has a base and two sides to define a bay. Both sides are similarly constructed. The sides and base are permanently attached to the aircraft according to specifications of the aircraft design. In the industry, pallet rollers under the bays and within an aircraft facilitate the movement of cargo pallets within the aircraft and into bays. The bay is sized to receive a pallet within the side walls over the base.

The pallet restraining systems in the prior art use vertical restraining lipped slots that run longitudinally and are aligned along bay sides that are sized to receive properly sized outboard edges on pallets. Distortions of the outboard edges above tolerance may prevent the pallet from fully fitting within the bay due to the fixed size lipped slots. For example, a pallet may have a distortion in area on the outboard edge where the magnitude of the distortion exceeds the opening of the lipped slot. In these cases, the pallet will not properly fit within the bay and there are only two options. The first option is to to replace cargo pallet with one having less outboard edge distortion. The second option is to correct or remove the deformation area of the outboard edge. Both of these solutions are costly and time consuming.

Instead of lips on the bay sides, Applicant's prior art inventions in U.S. Pat. Nos. 6,485,239 and 6,695,554 use a plurality of locking members mounted to the sides at intervals directed interiorly of the bay. Each locking member has an upper circular portion and a downward oriented elongated portion or tongue of the locking member. The upper portion of the locking member is circular with gears along this upper portion, for reasons that will be explained below. A tire shaped shock absorbing bumper is attached near the end of the elongated portion of each locking member. These bumpers are mounted on the locking member to extend beyond the tongue to rotate above the pallet as the pallet is introduced into the bay according to the variations in size of the pallet. Each locking member is mounted to the walls and in a manner that permits the locking member to rotate around a pivot point of the locking member which is the center of the circle defined by the upper circular portion of the locking member. As the locking member rotates about the pivot point the upper circular upper portion acts as a set of gears while the downward extended portion of the locking member, with bumper moves up and down to allow varying clearance to the bottom of the base. The locking member is attached to the sides of the bay using a threaded pin through a mounting hole, washer and locking member hold-down nut mounted through the pivot point to the walls. The locking member may also be secured to the side in any other way that will permit the locking member to freely rotate about pin, with or without roller bearings to minimize friction.

When used, the bumpers extend beyond the end of the elongated portion of the locking member and rotate about pin, held in place by nut. The bumpers eliminate metal on metal noise caused by metal pallets and a metal locking member. These bumpers could also be assisted by roller bearings to minimize friction with the races being centered around the pin.

It is important that the top portion of the locking member be circular so that as the pallet is inserted or withdrawn, the geared portion of the locking member rotates circularly about the pivot point at pin. In this way, as the extended portion of the locking member moves to accommodate the various dimensions of the outboard edges of the pallet, the locking member rotates the locking surface indentations, in a gear-like rotation.

To load, a pallet is moved into the bay, the outboard edges positioned under the bumpers. As the pallet is introduced into the bay the upper portion of the outboard edges urges the locking members to rotate, the upper portion of the locking member acting as a gear.

In the prior art, the locking member rotates in response to pallet distortions. Pallets are often distorted severely and the new embodiment of the present invention described more fully below will accommodate pallet distortion up to 2 inches or more, even though the recognized industry wide requirement is that a system be capable of accommodating pallet distortions up to 1.75 inches. In order to achieve this much higher deviation, the locking member must be long. In a preferred embodiment this locking member is at least 1.75 inches long and is generally longer. Because of this increased length each locking member must be able to withstand excessive torque and this in turn then requires that each locking member have a sufficiently strong locking mechanism.

The previous locking mechanism consists of corresponding spur gears on a straight rack that matingly engage gears located the locking member. The locking handle is connected to all of the locking members.

It should be understood that the prior art contemplates two levers, one on each side of the bay extending from a far end of the bay to a near end of the bay but both levers operate in the same manner. After the pallet is fully inserted in the bay, the locking handle is closed to lock locking members from further rotation by the interaction of the linear gears with the gears on the upper surface of the locking members. Locking handle is rotatively attached to the far end of the bay by a pin held by a slot. The pin in slot arrangement permits the lever to move between the unlocked position and the locked position when the locking handle is rotated.

A locking lever for each system is located at the near end of the bay. The locking lever is mounted to the interior side of the side walls using an end threaded pin at a hole at the extension portion of the locking lever and a nut. The locking lever raises from the wall against the urging of a locking elastic member. A detente ring is attached to the interior wall. The ring has two radially located locking dents to engage locking dimple located at the interior side of the extension on the locking handle. As the locking handle is rotated, the dimple moves from one locking dent against the urging of the locking elastic member to the other locking dent and retained therein with the urging of the locking elastic member. While there are many ways that are obvious to determine whether the locking lever is in the locked position, a simple method would be to mount a microswitch near the lever so that when the locking lever is in the fully locked position, the lever engages the microswitch. This permits an alarm system to be wired to the microswitch so that alarms can sound, or lights flash if any of the locking handles happen to be in the unlocked position or provide for an indicator means when all the locking handles are in the locked position. These microswitches are available to be suitably wired with alarm circuitry using technology that is well known in the industry. The alarms could be close and associated to each bay so that the cargo handlers could independently verify that the cargo pallets are properly locked into place and also wired with known technology to advise the pilot of the condition of the locking device for each bay.

When the locking handle is rotated into a closed position, the linear gears or teeth on the bottom surface of the locking lever engage the upward gears or teeth along the upper circular portion of the locking members. This prevents the locking members from rotating. The gears are attached to the underside of locking lever in any conventional manner where they would engage the locking members. Once the locking members are locked, vertical forces of the pallet are first translated directly to rotation forces of the locking members and not as forces to open the locking lever. Accordingly, the means to latch the locking member to the sides need not be more than necessary to maintain the member fixed to side with the gears engaged to the gears on the other gear.

As described above, distorted pallets are a significant problem. If the outboard edges of the pallet become distorted or broken from use or wear, the pallet will not slide into the lipped slots easily and the pallet may not be correctly placed within the cargo bay. When this happens, the cargo must be reloaded onto a new pallet and the defective pallet is either discarded or the distortion is physically corrected through removal or cutting out the damaged or distorted portion. This of course becomes impractical or even impossible at times. For example, if it is discovered after a pallet is loaded that the edges are uneven or deformed to the point where it is impossible to load, then it must be pulled, repacked and reloaded. This causes extensive timing issues and additional costs and overhead due to the added hours required to repack and reload. Other solutions to secure a pallet with deformed outboard edges, whether approved or not, include removal of the distorted portions of the outward edges by cutting until the horizontal edges of the pallet fit within the lipped slots. Cutting or correction of the distorted areas weakens the pallet and threatens the security of the cargo within the aircraft, and, as noted above, adds to the man hours required to fully prepare cargo for shipment, thus adding costs.

Also, due the current Global conditions caused by the Corona Virus pandemic, airlines are now constantly losing money due to decreased passenger traffic. These same airlines are now scrambling to find a way to easily convert their passenger cabin space into cargo space. Already there are a number of options and proposed solutions being used in the industry, but none truly provide an efficient, safe means to secure cargo. Some are strapping cargo to the existing seats, some or trying to place systems over the seats and others are having to remove all the seats and then find a safe and legal means to secure the cargo within the passenger bay. The present invention provides answers to all of these questions.

Accordingly, a need still exists for an easy, quick and assured means to load and constrain cargo and container pallets of cargo or seats within lower cargo bays and the main deck that allows for and adjusts to distorted outboard edges, allows for a wider variety of pallet sizes, provides for more efficient and faster loading and unloading, all the while safely restraining vertical movement and horizontal movement of the pallet within the bay.

More specifically, a means has been sought to find a cargo pallet hold down system having few moving parts, that will adapt to the various deformations of pallets and will lock the pallet to the aircraft bay. Ideally, the system is as strong as needed to constrain fully loaded pallets or containers yet be able to quickly engage and unengaged pallets within bays to facilitate fast loading and off-loading. The system of the present invention is easily installable within new aircraft and is easily adaptable to repurposed aircraft existing main cabins and cargo bays to reduce costs of implementation and ease of use, as well as function perfectly with normal pallets, deformed pallets, or pallets of differing size and configuration. Certain other performance requirements are beneficial to an ideal pallet hold-down device: the device should be constructed with few parts of commonly available materials and the operation should be easy to understand and should also tolerate misuse. The differences and nuances of the present invention are described and shown in FIGS. 1 through 12 and are described hereafter.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. These and other aspects of the invention will be apparent from and elucidated with reference to the embodiment(s) described hereinafter.

OBJECTS AND SUMMARY OF THE INVENTION

The present invention is a seat, cargo, pallet hold-down system to quickly restrain and un-restrain side, vertical, horizontal, forward or rearward movement of transportation cargo and passenger seats pallets of even or uneven shapes and various sizes within a transportation base, especially that of airplane bay. While the present invention can be used in any transportation base, such as in trains, tractor trailers, ships, or other transportation means, we will focus our description on airplane bays. When installed to replace an existing system or existing setup, the present system can be installed with minimum modification to the existing airplane bay. These bays can be either the original cargo bay or even the passenger seating bay. A vertical movement securement apparatus having a pair of parallel securement members can be installed to a base, in this case, an airplane bay floor, using methods known in the art, such as bolts or tie downs. The vertical movement securement apparatus has a plurality of lockable pallet securement apparatuses affixed to the parallel securement members. The plurality of lockable pallet securement apparatuses can be affixed to the pair of parallel securement members by means well known in the art, such as nuts and bolts. Each of the plurality of lockable pallet securement apparatuses has at least one pallet alignment member to facilitate pallet movement and positioning, at least one adjustable pallet engagement member that can adjust for pallet thicknesses, and a locking mechanism to lock and prevent movement of the at least one adjustable pallet engagement member. A horizontal movement securement apparatus has a rotatable member and at least one stopping member affixed to at least one end of the rotatable member. The at least one stopping member is rotatable into a stopping condition to prevent horizontal pallet movement. The rotatable member is interconnected with the vertical movement securement apparatus such that rotation of the rotatable member simultaneously locks both the vertical movement securement apparatus and the horizontal movement securement apparatus.

A pallet having outboard edges is inserted in between the pair of parallel securement members with the outboard edges placed under the first end of at least one adjustable pallet engagement member, urging the at least one adjustable pallet engagement member to rotate to accommodate distortions of the outboard edges. Once the pallet is fully inserted, the rotatable member is rotated to stop using the at least one stopping member, which in turn causes the rotatable member to engage with the locking mechanism of each of the plurality of lockable pallet securement apparatuses. The locking mechanism locks and prevents movement of the at least one adjustable pallet engagement member. The first end of the at least one adjustable pallet engagement member engages the upper surface of the pallet, restraining the vertical movement of the pallet when in locked condition. The at least one stopping member is affixed to an end of the rotatable member and, when rotated into a stopping condition, prevents horizontal pallet movement.

The at least one pallet engagement member can have a first pallet engagement end and a second rotatable end. The first end engages an upper surface of a pallet, and the second end engages the locking mechanism. The locking mechanism can lock or unlock the at least one pallet engagement member.

The locking mechanism can have a shaft, a first mating locking member movable along the shaft, a second mating locking member engaged to the shaft and rotatable, an elastic member, and a positioning member. The elastic member can be positioned between the first mating locking member and the second mating locking member. The mating locking members can be gears and the elastic member can be a spring. In order for the first mating locking member to engage with the second mating locking member, tension of the elastic member must be overcome. The second mating locking member can be an assembly having the second mating locking member, a plate having a first side and a second side, and the positioning member. The positioning member can have a first end, a middle portion, and a second end. The first side of the plate can be affixed to the second mating locking member. The second side of the plate can be affixed to the first end of the positioning member. The second end of the positioning member can engage the rotatable member. The assembly, the elastic member, and the first mating locking member can be held loosely together within each of the plurality of lockable pallet securement apparatuses by a cradle with a hole on a side facing the rotatable member. The positioning member fits through the hole to extend beyond the cradle to engage with the rotatable member. Other means of holding the moveable locking mechanism components within each of the plurality of lockable pallet securement apparatuses may be used besides a cradle.

The rotatable member can have at least one indent along its length. The at least one indent is aligned with the second end of each of the positioning member. When the rotatable member is rotated, the second end contact the at least one indent to cause the locking mechanism to be in the unlocked position. When the second end is not contacting the at least one indent, it causes the locking mechanism to be in locked position. This occurs because the non-indented surface along the length of the rotatable member push against the second end, which in turn moves the assembly against the elastic member until the tension of the elastic member is overcome by the pushing force. The first mating locking member then engages the second mating locking member to lock the shaft to prevent the at least one adjustable pallet engagement member's rotation.

The at least one stopping member can have an upper member connectable to the rotatable member, a block affixed to the upper member, and a cradle. The block is in the locked condition when the block is rotated into the cradle. The block is in the unlocked condition when the block is rotated up and out of the cradle. The cradle secures the block in position and prevents further rotation. The at least one stopping member restrains forward movement of the pallet or pallets during forward accelerations in normal operations as well as in emergency landing conditions, or rearward movement during braking or landing, therefore eliminating the need for a crash barrier. The pallet hold-down system also restrains sideways or horizontal movement so as to stabilize the cargo during transportation. The horizontal movement securement apparatus is designed to stop both $\frac{3}{8}$" and $\frac{3}{4}$" pallets with distortions ranging from 0" to 1.75" in accordance with current pallet distortion limit guidelines. An alarm to detect the status of the at least one stopping member can also be provided. The alarm can notify a user when the pallet hold-down system is not properly set in the locked condition. The alarm can be a microswitch with alarm circuitry.

In another embodiment, the pallet hold-down system can have a vertical moment securement apparatus having at least a pair of parallel system securement apparatuses, and a plurality of lockable pallet securement apparatuses affixed to the at least a pair of parallel system securement apparatuses. Each of the plurality of lockable pallet securement apparatuses can have at least one pallet aligner and at least one adjustable lockable pallet securement apparatus. Each of the at least one adjustable lockable pallet securement apparatus can have a rod, a first end having a contact member for contacting an upper surface of a pallet, and a second rotatable end connectable to the rod. Each of the plurality of lockable pallet securement apparatuses can further have a locking mechanism to lock and unlock each of the at least one lockable pallet securement apparatus. The locking mechanism can have a first mating locking apparatus, a second mating locking apparatus, an elastic member positioned between the first mating locking apparatus and the second mating locking apparatus, and an elongated contacting member. The rotatable member can have a plurality of first and second contact points along its length and circumference, and positioned in line with the elongated contacting member. When rotating the rotatable member to an unlocked position, the plurality of first contact points meet with the elongated contacting member to disengage the first and the second mating locking apparatuses. When rotating the rotatable member to a locked position, the plurality of second contact points engage with the elongated contacting member and push and compress the elastic member until the second mating locking apparatus and the first mating apparatus lock onto the other. The horizontal movement securement apparatus can have at least one stop block attached to the at least one end of the rotatable member and at least one stop block cradle.

The pallet hold-down system can receive and secure different sized pallets, including smaller pallets that can be loaded through a side door. The pallet hold-down system can be used in an airplane passenger bay and thus utilize the side, passenger door. The pallet-hold down system can receive and load pallets from this side passenger door. Smaller pallets can be used, and the smaller pallets can be pre-configured with rows of seats. An airplane passenger bay can be turned into a cargo bay by installing the pallet hold-down system and loading small pallets through the side passenger door. The airplane bay also can be a cargo bay. The cargo bay can be turned into a passenger bay by installing the pallet hold-down system and loading palletized seats through the cargo door or side bay door.

A method for using an embodiment of the pallet hold-down system to secure at least one pallet is also provided. The steps are: installing a vertical movement securement apparatus by installing a pair of parallel securement apparatuses to a base, and installing a plurality of lockable pallet securement apparatuses to the pair of parallel securement apparatuses where the plurality of lockable pallet securement apparatuses engage an upper surface of the at least one pallet and can be alternated between an unlocked and a locked condition; installing a horizontal movement securement apparatus by installing a rotatable member, and installing at least one stopping member affixed to at least one end of the rotatable member; interconnecting the vertical movement securement apparatus and the horizontal movement securement apparatus via the rotatable member; unlocking both the vertical movement securement apparatus and the horizontal movement securement apparatus by rotating the rotatable member to the first position; and locking both the vertical movement securement apparatus and the horizontal movement securement apparatus by rotating the rotatable member to the second position.

The method can also have vertical movement locking steps of: using the vertical movement securement locking mechanism; loading and aligning at least one pallet using said pallet aligners; contacting an upper surface of the at least one pallet with the contact member of the first end of each of the at least one adjustable and lockable pallet securement apparatus; rotating the second rotatable end of each of the at least one adjustable and lockable pallet securement apparatus to conform the first end to the pallet upper surface; locking the at least one pallet into place using the locking mechanism by rotating the rotatable member; switching between the plurality of first contacting points to the plurality of second contacting points along the length of the rotatable member at the plurality of second contacting points; urging the first mating locking apparatus against the elastic member; compressing the elastic member; and forcing the first mating locking apparatus to engage and lock with the second mating locking apparatus.

The method can also have horizontal movement locking steps of: using the horizontal movement securement apparatus; loading at least one pallet until a trailing end of the at least one pallet is past the horizontal movement locking apparatus; locking the at least one pallet into place by rotating the rotatable member and the at least one stop block; urging the at least one stop block into the at least one stop block cradle; locking the at least one stop block into the at least one stop block cradle; and preventing the at least one pallet horizontal movement by blocking at least the trailing end of the at least one pallet with the at least one stop block.

Pallets can also be loaded into an airplane, having the steps of: having at least one smaller pallet; opening an airplane side door; loading the at least one smaller pallet through the airplane side door; sliding and positioning the at least one smaller pallet into position within the airplane; and locking the at least one smaller pallet into place. There also can be an additional step of having an alarm system to automatically check if the hold-down system is in a locked or unlocked position and generating a warning if the pallet hold-down system is not in the appropriate position. Palletized seats can be loaded with an additional step of affixing seats to the short pallet and loading the pallet through the side passenger door.

A method for quickly converting a plane passenger compartment to a cargo compartment using a pallet hold-down system for an airplane bay is also provided, having the steps of rotating a rotatable horizontal movement stopping member affixed to a rotatable member from a locked position to an open position, thereby unlocking the stopping member and unlocking a plurality of lockable pallet securement apparatuses that previously secured palletized seats to a pair of parallel securement members affixed to a floor of the airplane bay; removing the palletized seats through a side passenger loading door; inserting smaller, pre-palletized cargo through the side passenger loading door; rolling smaller pallets along a series of floor rollers wherein tops of the pallets are guided under a rotatable disc at a bottom of the plurality of lockable pallet securement apparatuses and into position within said passenger bay until passenger bay is full; and rotating the stopping member into the locked position once all pallets are in place, thereby simultaneously locking the plurality of lockable pallet securement apparatuses and thus securing cargo both vertically and horizontally.

Accordingly, it is a general object of the present invention to provide an improved cargo pallet retaining means for any transportation, but especially for airplanes.

More specifically, it is an object of the present invention to provide a palletized cargo or container vertical restraining means that conforms to a pallet even when the pallet outboard edges are distorted.

It is also an object to provide an improved hold down system for an air cargo pallet that is simple to operate and easy to use.

It is a further object of this invention to provide an improved hold down system that includes a means to determine whether the hold down device is in a locked or unlocked position.

It is another object of the present invention to attain the foregoing objects and also to provide an improved pallet hold down system that is strong, easy to understand and adaptable in environments where loading and off-loading must be done within short time periods.

It is another object of the present invention to attain the foregoing objects and also to provide a smaller pallet load and offload ability, such as through an existing passenger door, so as to allow passenger compartments to be easily converted from seat carrying to cargo carrying bays.

Because containers and pallets used in interstate commerce and internationally are government certified for maximum load capacities with mandatory positive side vertical restrains, this invention ensures that these vertical restrains are met.

This invention also ensures that load capacities and positive side vertical restraints certifications are met as well.

This invention also provides for better distribution of up-gust loads to other floor beams within the bays to relieve excessive loading of the end beams and increased pallet and container loads within the aircraft.

This invention additionally, ensures distribution of kick loads to other floor beams within the bay to reduce loading of the end latches and floor beams, reducing the need in most cases of a crash bulkhead or barrier fore of the cargo.

Further objects and advantages of this invention will become apparent from a consideration of the drawings and ensuing description thereof.

DETAILED DESCRIPTION OF THE PREFERRED EMBODIMENTS

The present invention enhances and builds upon some of the same technology as that described above in Applicant's previous patents U.S. Pat. Nos. 6,485,239 and 6,695,554. However, there are many new aspects of the present invention that will be discussed now. This invention features several advantages over the prior art. First is the ability to more securely lock down the pallets to prevent vertical motion. This is done in this first embodiment by utilizing the gearing mechanism and the rotatable locking mechanism. Second is the ability to lock and prevent motion simultaneously in the vertical and horizontal directions.

The pallet loading procedures described above are the same and will not be repeated here. One significant difference between the present invention and the prior art is the amount of space provided for distorted pallets. Previously, both the side lipped slots and pallet outboard edges had to be within 0.25 of an inch of flat to ensure the positive vertical contact necessary to restrain the pallet from vertical motion and to enable the outboard edges to slide within the lipped slots as the pallet was secured. Now, the industry wide requirement for system compliance to accommodate pallet distortion is up to 1.75". This is much larger than previously specified and the invention described herein accommodates this now recognized pallet distortion dimension. In fact, due to the design of the current system, it is possible to accommodate even larger tolerances than the 1.75" dimension.

Figure 1:
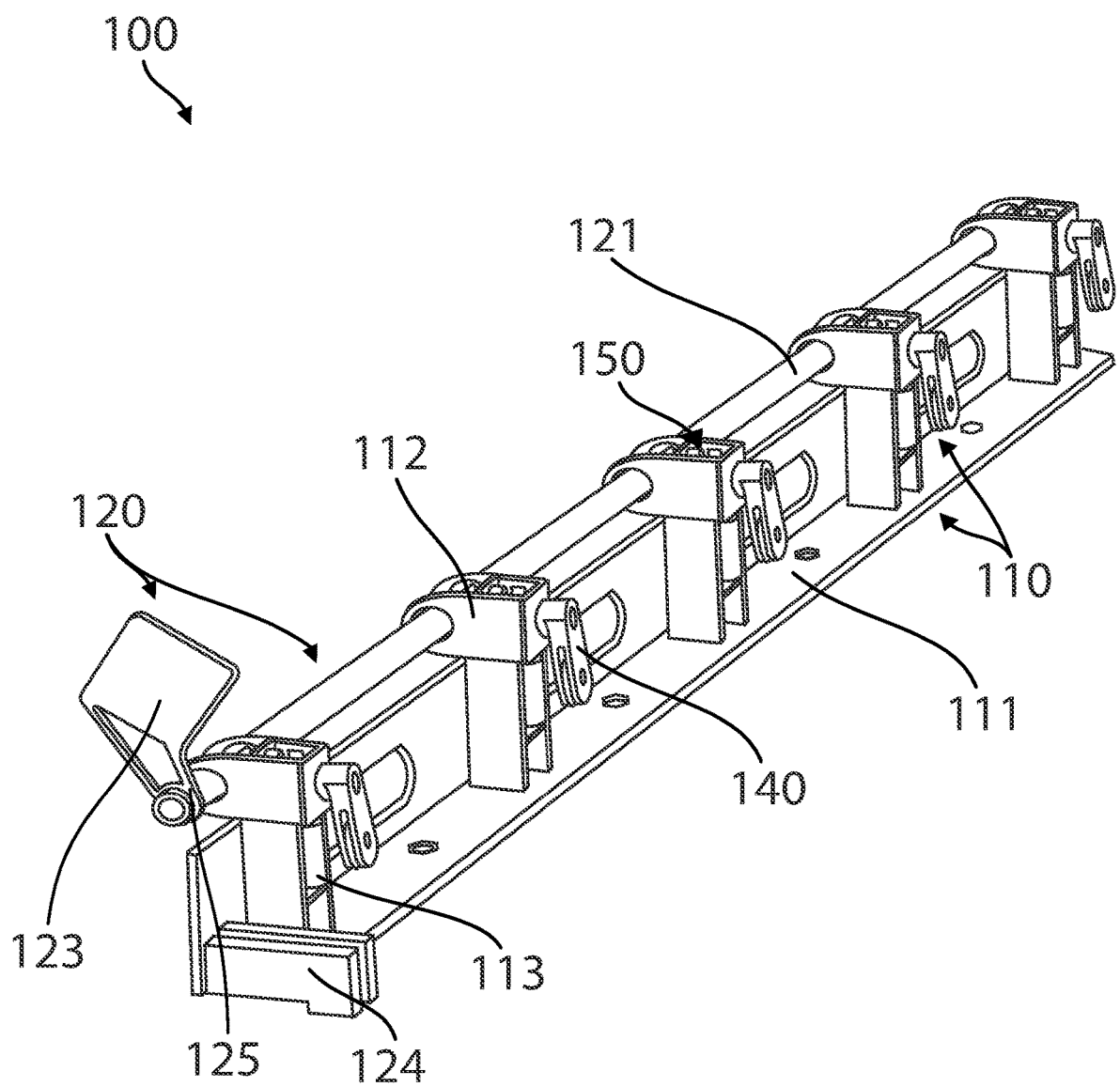
FIG. 1 is an elevated perspective view of an embodiment of the pallet hold-down system illustrating a left component of a pair of a parallel securement members with a plurality of lockable pallet securement apparatuses attached, with a stopping member and a rotatable member of a horizontal movement securement apparatus rotated to an unlocked condition.
Figure 2:
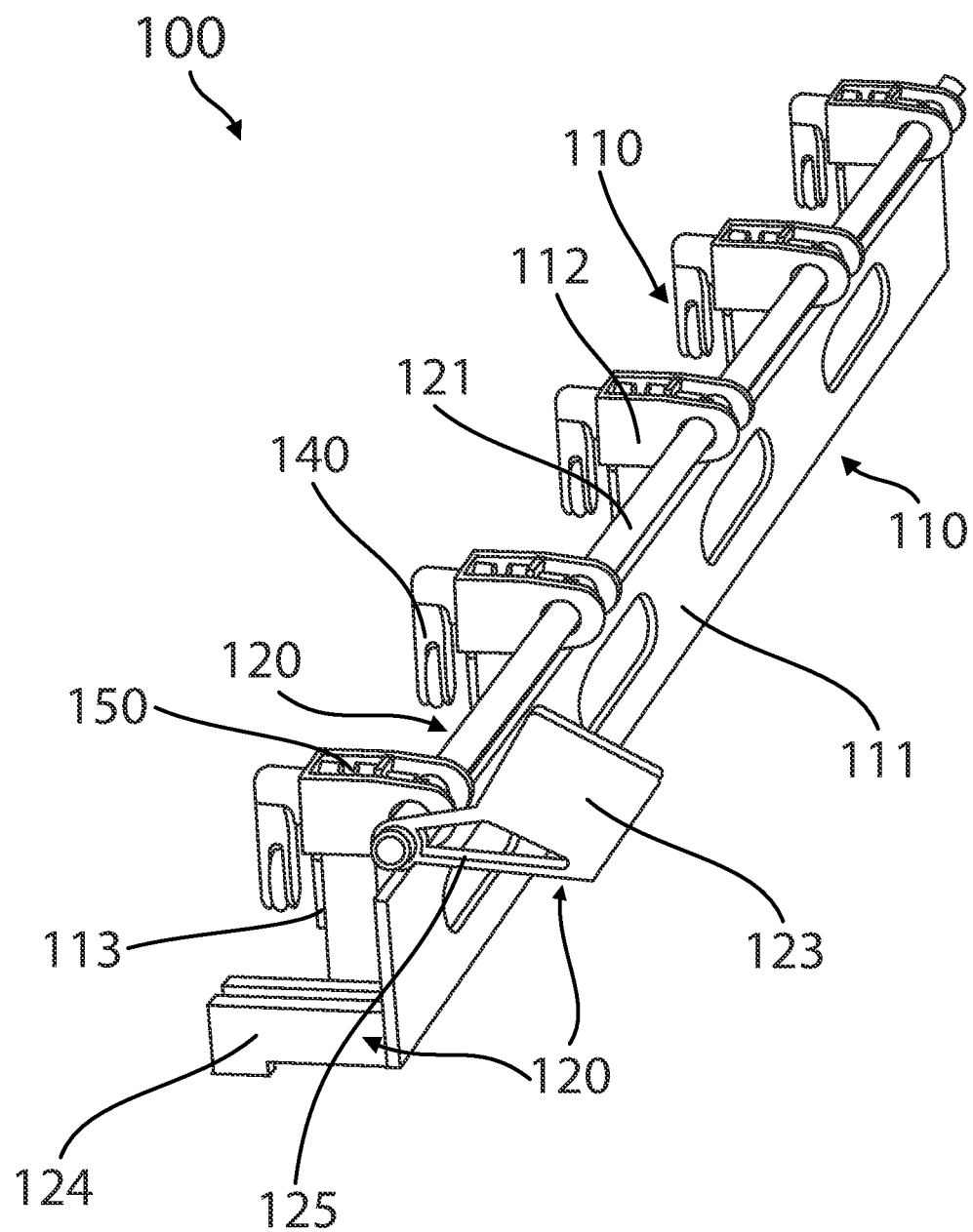
FIG. 2 is an elevated perspective view of an embodiment of the pallet hold-down system illustrating a right component of the pair of the parallel securement members illustrated in FIG. 1, with a plurality of lockable pallet securement apparatuses attached, with a stopping member and a rotatable member of a horizontal movement securement apparatus rotated to an unlocked condition.

When installed to replace an existing system in an airplane, the present system is installed with minimum modification to the existing bays. FIG. 1 is an elevated perspective view of an embodiment of the pallet hold-down system 100. The pallet hold-down system 100 has a vertical movement securement apparatus 110 and a horizontal movement securement apparatus 120. The vertical movement securement apparatus 110 has a pair of the parallel securement members 111. FIG. 1 illustrates a left component of a pair of the parallel securement members 111 and FIG. 2 illustrates a right component of the pair of the parallel securement members 111. The pair of the parallel securement members 111 can be L-shaped as shown. However, the pair of the parallel securement members 111 can be of different shapes and sizes than as illustrated, and both sides of the pair do not have to have the same shape or size. The pair of the parallel securement members 111 in FIG. 1 and FIG. 2 shows evenly spaced holes on the vertical portion of the each of the pair of parallel securement members 111, but these holes are not necessary. The pair of the parallel securement members 111 are removably affixed to the airplane bay floor by nuts in this embodiment. However, other methods known in the art may be used to affix a pair of the parallel securement members 111 to a base of a transportation. As seen in FIG. 1, a plurality of lockable pallet securement apparatuses 112 are attached to the pair of the parallel securement members 111. Each of the plurality of lockable pallet securement apparatuses 112 have at least one pallet alignment member 113 (a pallet aligner), at least one adjustable pallet engagement member 140, and a locking mechanism 150. More details on the at least one adjustable pallet engagement member 140 and the locking mechanism 150 will be described later. As illustrated, the plurality of lockable pallet securement apparatuses 112 are affixed to the vertical portion of the pair of the parallel securement members 111.

The horizontal movement securement apparatus 120 has at least one stopping member which can be a block 123 (a stop block) and a cradle 124 (a stop cradle) system, connected to a rotatable member 121. The block 123 and the cradle 124 can be of different shapes and sizes than the ones shown in FIG. 1 and FIG. 2, as long as they are designed to function together as a stopping member. The cradle 124 is attached to each component of the pair of the parallel securement members 111 in FIG. 1 and FIG. 2, but does not need to be attached this way. The block 123 is affixed to an upper member 125 that is connected to the rotatable member 121. Any means known in the art can be used to affix the stopping member to the rotatable member 121, such as welding them together. The rotatable member 121 is interconnected to the vertical movement securement apparatus 110 and the horizontal movement securement apparatus 120 such that the rotation of the rotatable member 121 simultaneously locks both the vertical movement securement apparatus 110 and the horizontal movement securement apparatus 120. In the embodiment shown, the rotatable member 121 is a rod 121. The rotatable member 121, which is a component of the horizontal movement securement apparatus 120, interconnects with the vertical movement securement apparatus 110 by being inserted into holes that are present in each of the plurality of lockable pallet securement apparatuses 112. Other means of interconnecting the vertical movement securement apparatus 110 to the horizontal movement securement apparatus 120 may be used. In this embodiment, each of the plurality of lockable pallet securement apparatuses 112 has two holes that lie adjacent to a length of the rotatable member 121 so the rotatable member 121 can be inserted through these holes. The rotatable member 121 is rotatably held by the holes. How the rotatable member 121 engages the plurality of lockable pallet securement apparatuses 112 will be discussed in descriptions of FIGS. 5 through 8. When the stopping member, the block 123 component in FIG. 1 and FIG. 2, is rotated up and out of the cradle 124 as illustrated in FIG. 1 and FIG. 2, both the vertical movement securement apparatus 110 and the horizontal movement securement apparatus 120 are in an unlocked condition.

Figure 3:
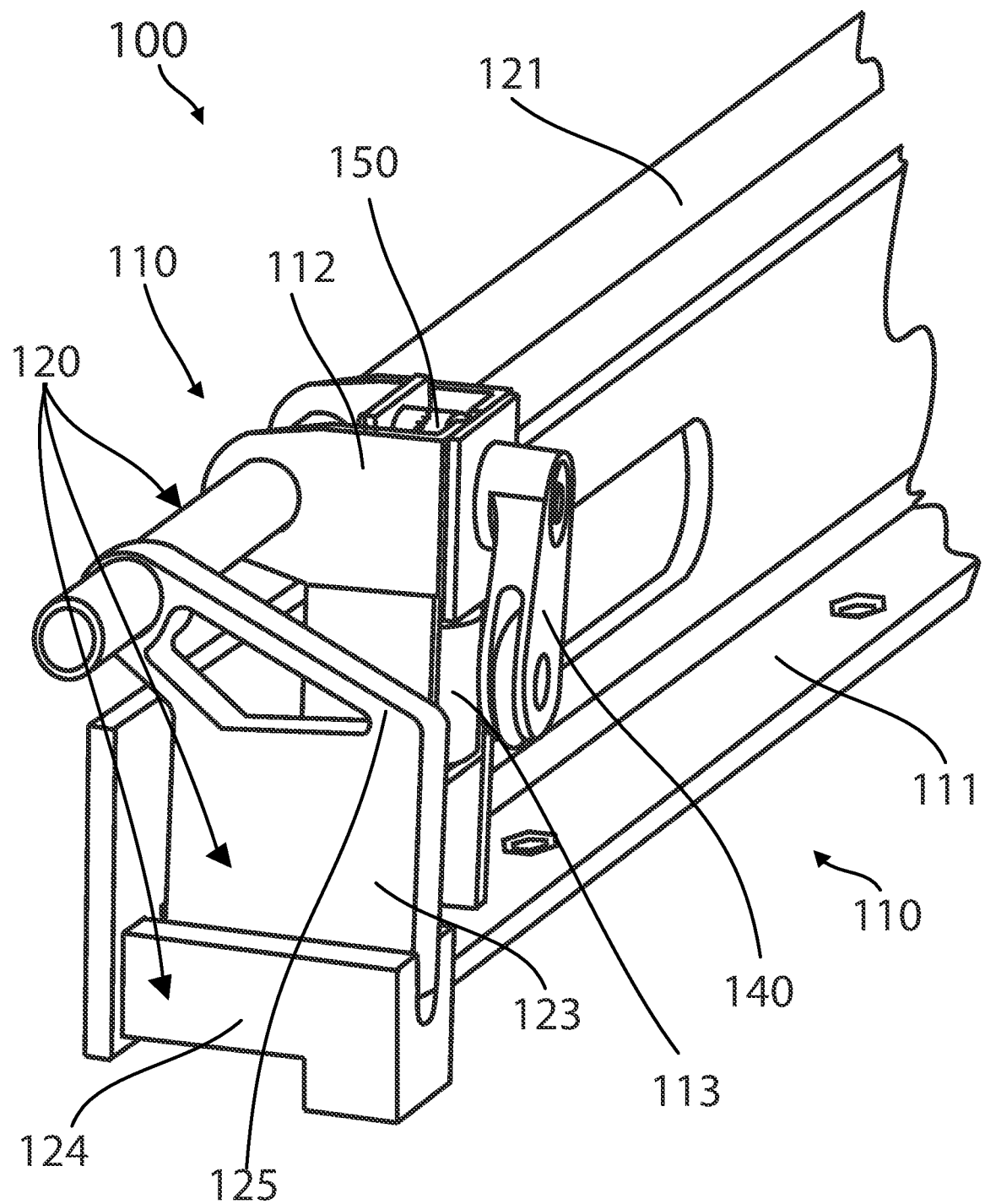
FIG. 3 is a perspective view of an embodiment of the pallet hold-down system illustrating a stopping member in locked position.

FIG. 3 is a close-up perspective view of an embodiment of the pallet hold-down system 100 illustrating the stopping member in locked condition. Both the vertical movement securement apparatus 110 and the horizontal movement securement apparatus 120 are illustrated as broken towards the back (right side of the page). In FIG. 3, the stopping member is made of the block 123 and the cradle 124 system. Here, the cradle 124 has a u-bend for the square-shaped block 123 to fit into. When rotated into the locked condition, the block 123 is nestled inside the cradle 124. The cradle 124 prevents further rotation of the block 123 through physically blocking the block 123 from further rotation or by some kind of locking mechanism within the cradle 124 (not illustrated). Any types of locking mechanism known in the art may be applied. This locking mechanism can be electronically activated, or it can be a mechanical system, such as lock bars, or locking pins or some other mechanical means. If electronic it can be locked by simply pushing an activation button or switch and if mechanical, it can be activated manually. In this embodiment, the cradle 124 is attached to the horizontal component of one of the pair of the parallel securement members 111 so that the vertical component of one of the pair of parallel securement members 111 also physically prevent the block 123 from further rotation. In FIG. 3, the rotatable member 121 is the rod 121 that inserts through holes in each of the plurality of lockable pallet securement apparatuses 112 (only one illustrated). Each of the plurality of lockable pallet securement apparatuses 112 have at least one pallet alignment member 113, a locking mechanism 150, and an adjustable pallet engagement member 140. The block 123 is affixed to an end of the rotatable member 121 by an upper member 125 so the rotating of the block 123 also rotates the rotatable member 121. The rotatable member 121 is held loosely in the holes of the in each of the plurality of lockable pallet securement apparatuses 112 to allow for rotation. The rotating and locking of the block 123 into the cradle 124 causes rotation of the rotatable member 121, which in turn engages with the locking mechanism 150 to lock the at least one adjustable pallet engagement member 140 of the plurality of lockable pallet securement apparatuses 112. Therefore, the locking of the horizontal movement securement apparatus 120 also causes the vertical movement securement apparatus 110 to lock. The block 123 also acts to stop the pallet's forward acceleration, thereby restraining the pallet locally, and eliminating the need for a crash barrier. The stopping member is of sufficient design, configuration and material strength to prevent any forward pallet movement. The stopping member composed of the cradle 124, the upper member 125, and the block 123, is also of sufficient material strength and is designed to stop both ⅜" and ¾" pallets with distortions ranging from 0" to 1.75" in accordance with current pallet distortion limit guidelines. The stopping member can be manually and mechanically operated or it can be electronically activated. If manual, then a user simply must rotate the block 123 into the cradle 124. If electronically, then an electronic system can be put in place and an activation system put in place to automatically rotate and lock the block 123 into the cradle 124. More details on the locking mechanism 150 and the adjustable pallet engagement member 140 will be given in descriptions of FIGS. 5 through 8.

Figure 4:
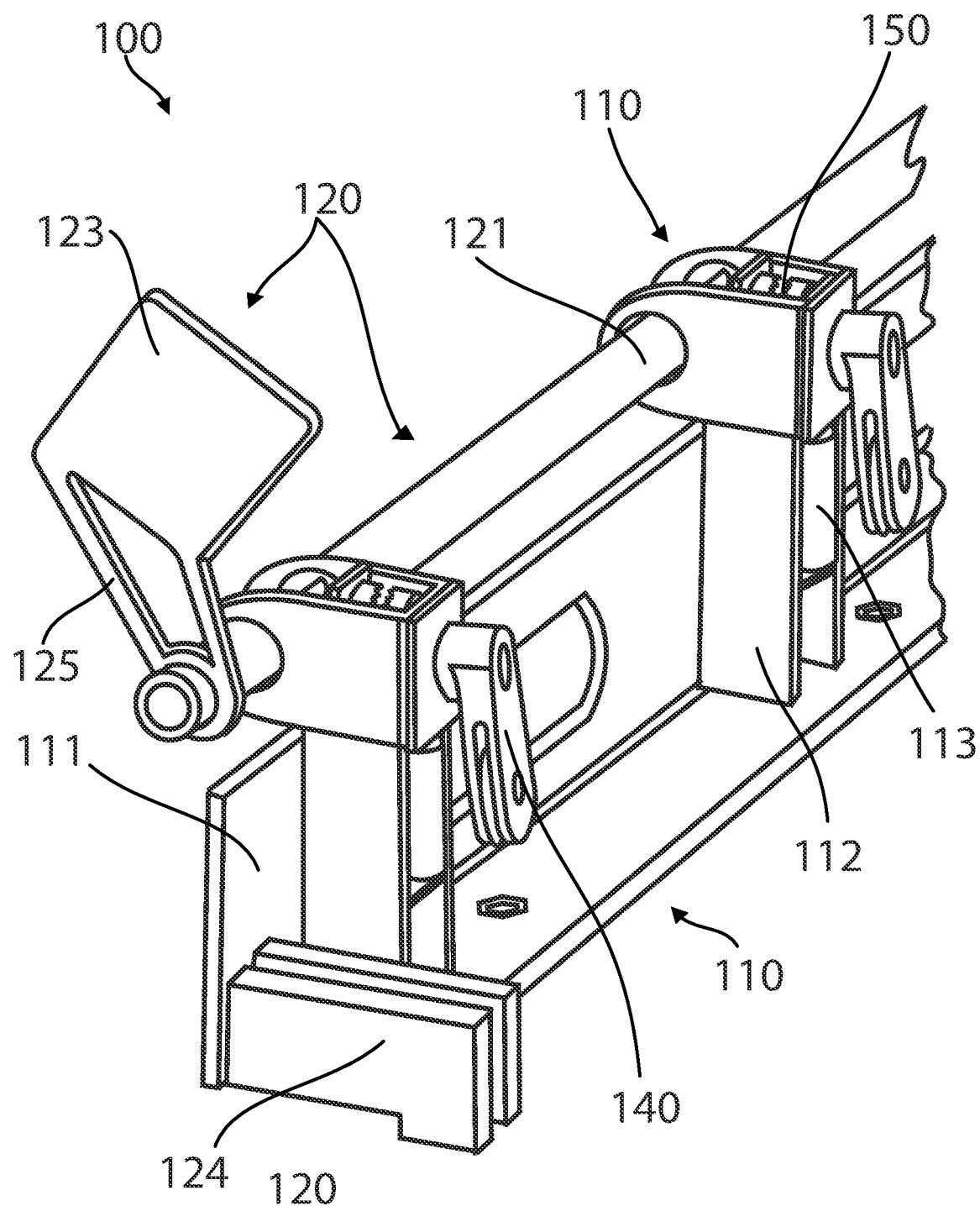
FIG. 4 is a perspective view of an embodiment of the pallet hold-down system illustrating a stopping member in unlocked position.

FIG. 4 is a close-up perspective view of an embodiment of the pallet hold-down system 100 illustrating the stopping member in unlocked condition. Both the vertical movement securement apparatus 110 and the horizontal movement securement apparatus 120 are illustrated as broken towards the back (right side of the page). In FIG. 4, the stopping member uses the block 123 and the cradle 124 system. The cradle 124 here also has the u-bend for the square-shaped block 123 to fit into. When rotated into the unlocked condition, the block 123 is rotated away from the cradle 124. In this embodiment, the cradle 124 is attached to the horizontal component of one of the pair of parallel securement members 111 but it is not necessary for the cradle 124 to be attached this way. Like FIG. 3, the rotatable member 121 is the rod 121 that inserts through holes in each of the plurality of lockable pallet securement apparatuses 112.

Each of the plurality of lockable pallet securement apparatuses 112 have at least one pallet alignment member 113, the locking mechanism 150, and the at least one adjustable pallet engagement member 140. The block 123 is affixed to the end of the rotatable member 121 by the upper member 125 so the rotating of the block 123 also rotates the rotatable member 121. The rotatable member 121 is held loosely in the holes of the in each of the plurality of lockable pallet securement apparatuses 112 to allow rotation. The rotating and moving the block 123 out of the cradle 124 causes rotation of the rotatable member 121, which in turn disengages with the locking mechanism 150 to unlock the adjustable pallet engagement member 140 of each of the plurality of lockable pallet securement apparatuses 112. Therefore, the unlocking of the horizontal movement securement apparatus 120 also causes the vertical movement securement apparatus 110 to unlock. More details on the locking mechanism 150 and the adjustable pallet engagement member 140 will be given in descriptions of FIGS. 5 through 8.

Figure 5:
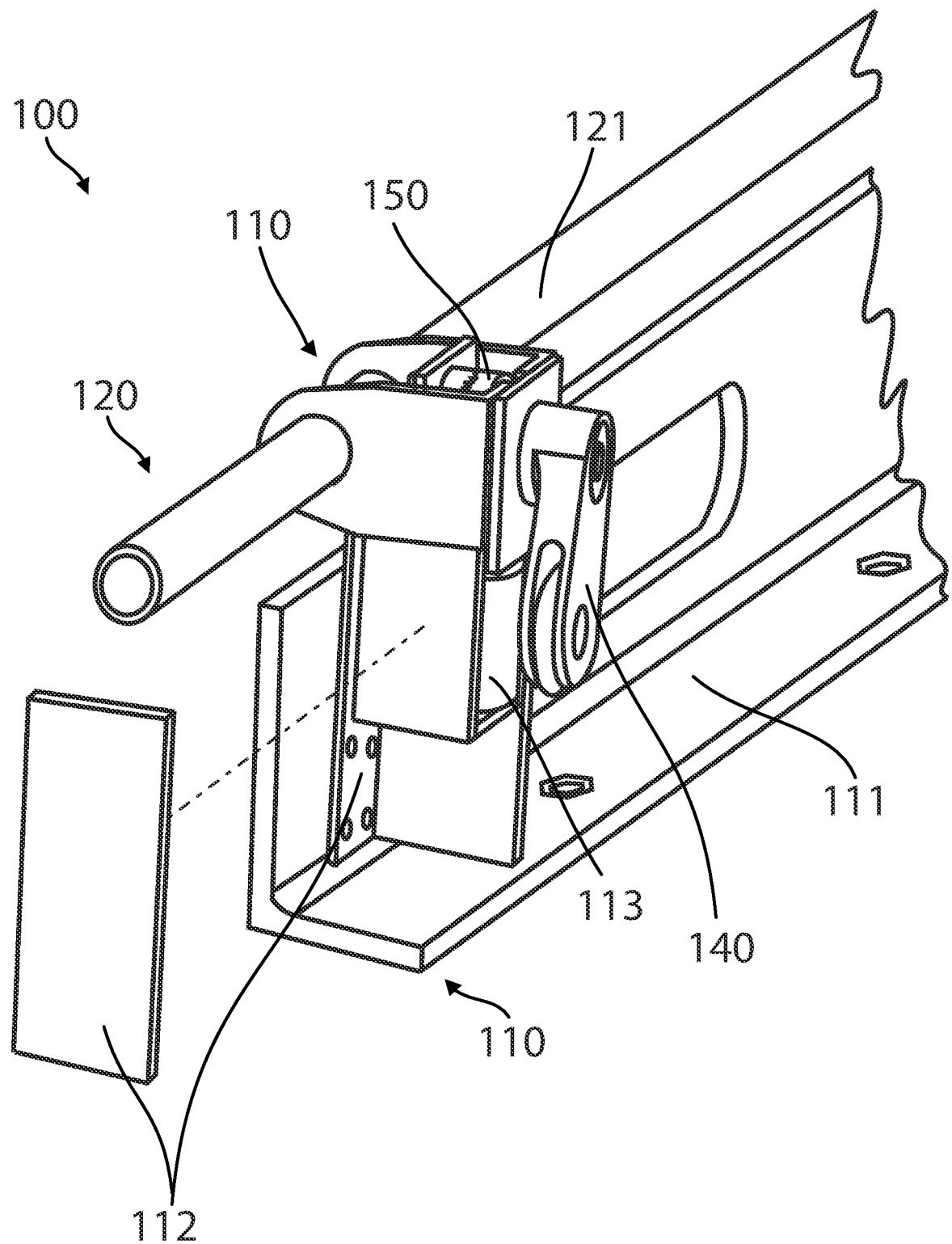
FIG. 5 is a perspective view of an embodiment of the pallet hold-down system showing a partially exploded vertical movement securement apparatus with one of its elongated sides removed, illustrating how a lockable pallet securement apparatus connects to a parallel securement member.

FIG. 5 is a partially exploded close-up perspective view of an embodiment of the pallet hold-down system 100. Both the vertical movement securement apparatus 110 and parts of the horizontal movement securement apparatus 120 are illustrated as broken towards the back (right side of the page). In FIG. 5, the vertical movement securement apparatus 110 has the pair of parallel securement members 111, one component of which is illustrated, and the plurality of lockable pallet securement apparatuses 112. Each of the plurality of lockable pallet securement apparatuses 112 have the at least one pallet alignment member 113, the locking mechanism 150, and the at least one adjustable pallet engagement member 140. One of the elongated sides is removed from the lockable pallet securement apparatus 112 to reveal how the lockable pallet securement apparatus 112 can be affixed to one component of the pair of the parallel securement members 111. In FIG. 5, four screws are used to affix the back board of one of the lockable pallet securement apparatuses 112 to the vertical component of one of the pair of parallel securement members 111. Any number of screws can be used for this purpose, and any known method of affixing components to one another can be used to attach the lockable pallet securement apparatus 112 to the parallel securement member 111. The horizontal movement securement apparatus 120 has the rotatable member 121. Stopping member is not shown in this illustration but can be seen in the other FIGS. 1 through 4, and 10.

Figure 6:
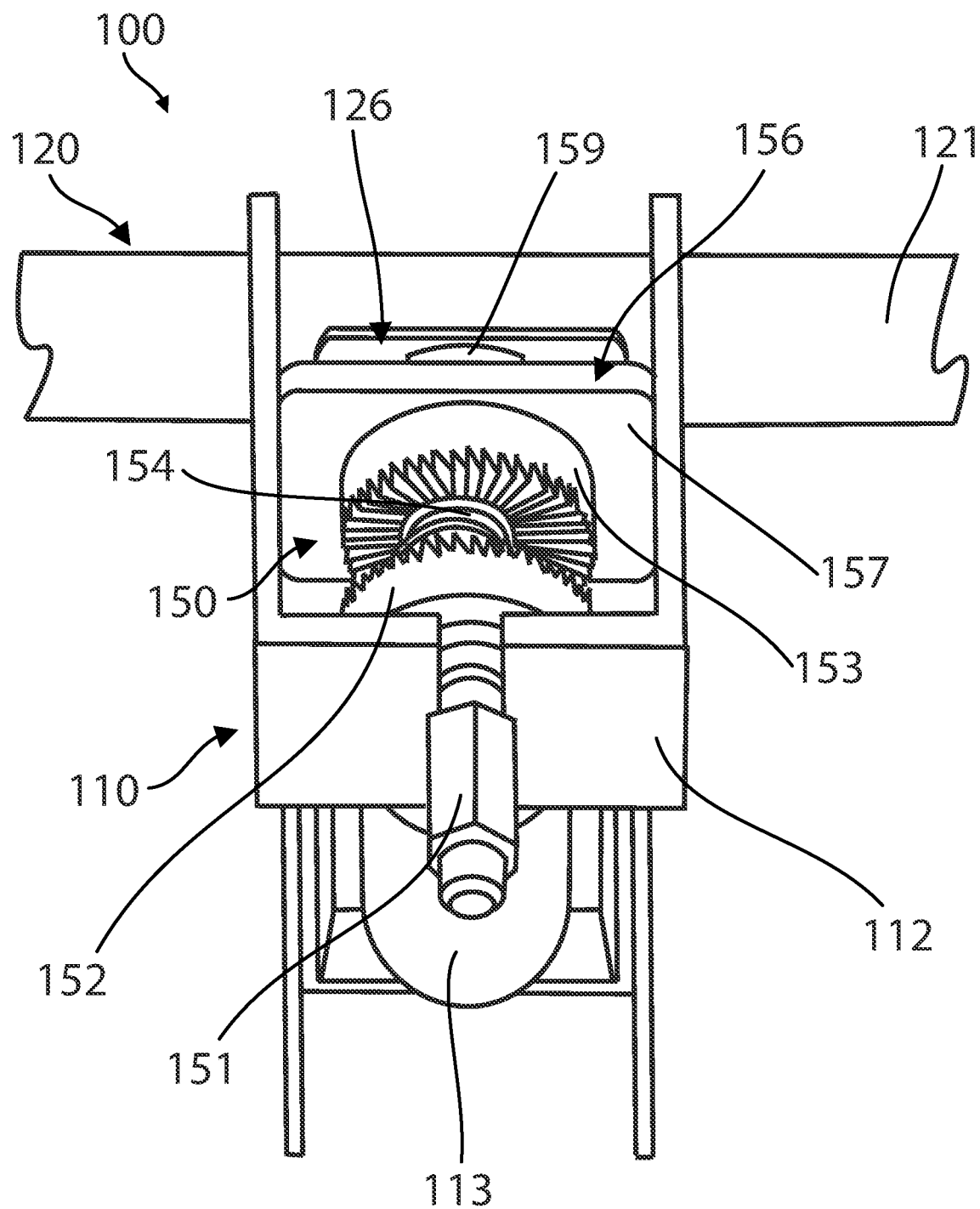
FIG. 6 is a front elevated view of a lockable pallet securement apparatus of an embodiment of the pallet hold-down system without an adjustable pallet engagement member attached, illustrating a rotatable member in an unlocked position to show a first mating locking member and a second mating locking member of a locking mechanism in an unlocked position.
Figure 7:
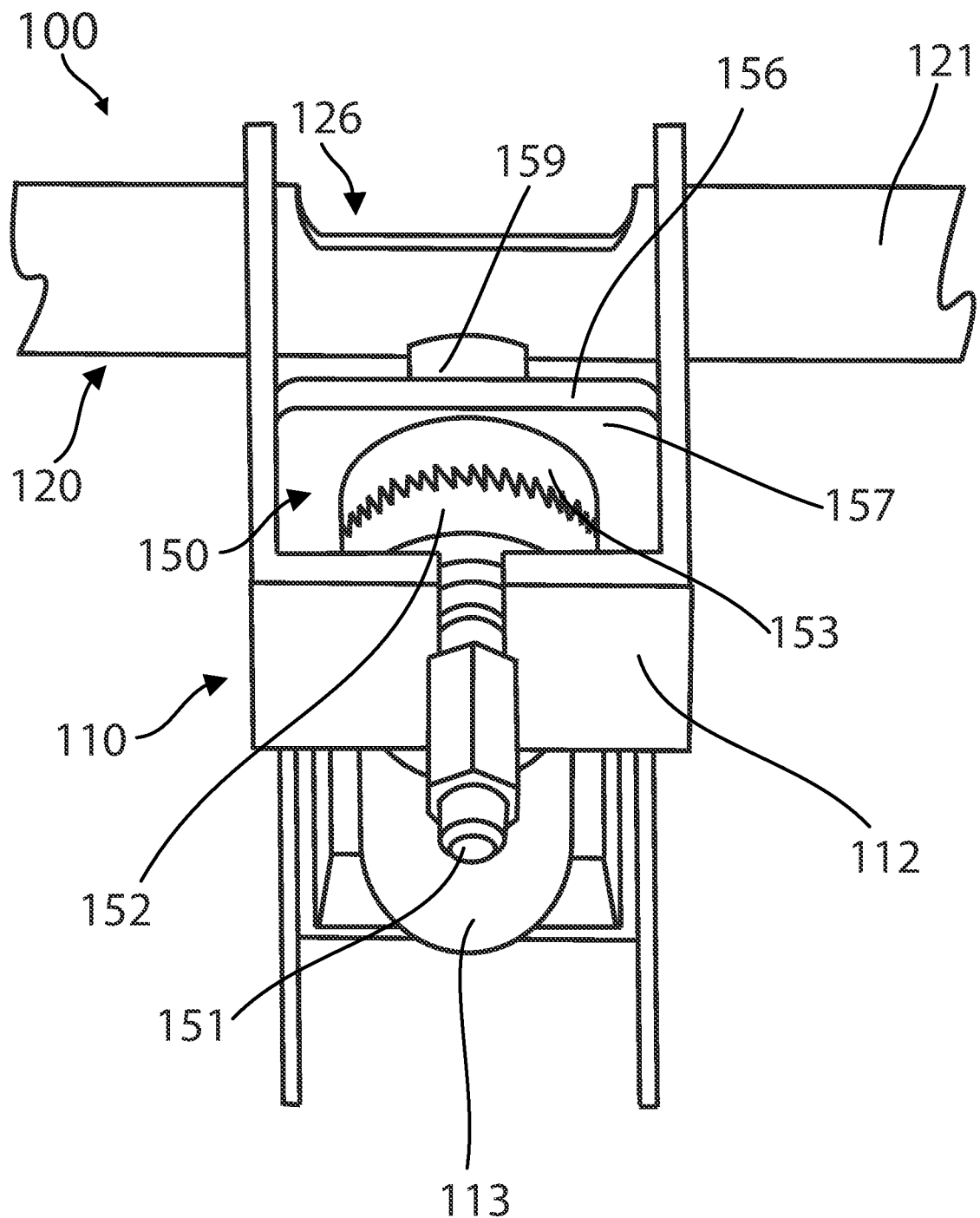
FIG. 7 is a front elevated view of a lockable pallet securement apparatus of an embodiment of the pallet hold-down system without an adjustable pallet engagement member attached, illustrating a rotatable member in a locked position to show a first mating locking member and a second mating locking member of a locking mechanism in a locked position.

FIG. 6 and FIG. 7 are a front elevated view of a lockable pallet securement apparatus 112 of an embodiment of the pallet hold-down system 100 without the adjustable pallet engagement member 140 attached. The rotatable member 121 of the horizontal movement securement apparatus 120 is illustrated as broken on both sides. The rotatable member 121 for the embodiment in FIG. 6 and FIG. 7 is the rod 121. Any other elongated form can be used. The pallet alignment member 113 is also shown. To prevent motion, to prevent rattle and noise and to facilitate easier pallet loading it is desirable to utilize some sort of cushioning member. In the embodiment shown, the lockable pallet securement apparatus 112 has two elongated sides with the pallet alignment member 113 positioned between the two elongated sides. The pallet alignment member 113 can be made of cushioning material such as rubber, or of any type of cushion as long as it prevents rattle and noise and provides the ability to more easily load pallets. It is preferred that the pallet alignment member 113 is a rotatable roller member, as illustrated, that facilitates cushioning, shock absorption, pallet movement and positioning. The pallet alignment member 113 does not need to be rotatable. The pallet alignment member 113 can be made of shock absorbing material, cushioning material or both, such as rubber, hard silicon, hard foam, polycarbonate, polyurethane, or any other material that provides cushion but that will not wear out quickly.

The locking mechanism 150 can be seen in detail on both FIG. 6 and FIG. 7. The locking mechanism 150 has the shaft 151, the first mating locking member 153 moveable horizontally along the shaft 151, the second mating locking member 152, the elastic member 154 positioned between the first mating locking member 153 and the second mating locking member 152, and the positioning member 159. The first mating locking member 153 and the second mating locking member 152 are gears in this embodiment. The elastic member 154 is a spring in this embodiment. The first mating locking member 153 is an assembly having the first mating locking member 153 that is moveable horizontally along the shaft but that is rotationally immoveable, a plate 156 having a first side 157 and a second side 158, and a positioning member 159. The positioning member 159 has a first end 161, a middle portion 162 and a second end 160. The first side 157 of the plate 156 is affixed to the first mating locking member 153. The second side 157 of the plate 156 is affixed to the first end 161 of the positioning member 159. The second end 160 of the positioning member 159 engages the rotatable member 121. The rotatable member 121 has at least one indent 126 along a length of the rotatable member 121. The at least one indent 126 align with the second end 160 of the positioning member 159. FIG. 6 shows the locking mechanism 150 in an unlocked position. When the rotatable member 121 is rotated to the unlocked position, the second end 160 of the positioning member 159 is aligned with and contacts the at least one indent 126, causing the locking mechanism 150 to be unlocked by allowing the tension of the elastic member 154 to push the plate 156 and the affixed first mating locking member 153 away from the second mating locking member 152.

FIG. 7 shows the locking mechanism 150 in locked position. When the second end 160 of the positioning member 159 is not aligned with the at least one indent 126, this causes the locking mechanism 150 to be in a locked position. The rotation of the rotatable member 121 to locking position causes the at least one indent 126 to be rotated away so non-indented portions of the length of the rotatable member 121 align and contact with the second end 160 of the positioning member 159. The rotatable member 121 contacts and pushes against the second end 160 of the positioning member 159 with enough force to overcome the tension of the elastic member 154, causing the plate 156 and the affixed first mating locking member 153 to move along the shaft 151 and come in contact with the second mating locking member 152, preventing the rotation of the second mating locking member 152, which in turn prevents movement of the shaft 151 and the attached adjustable pallet engagement member 140.

Figure 8:
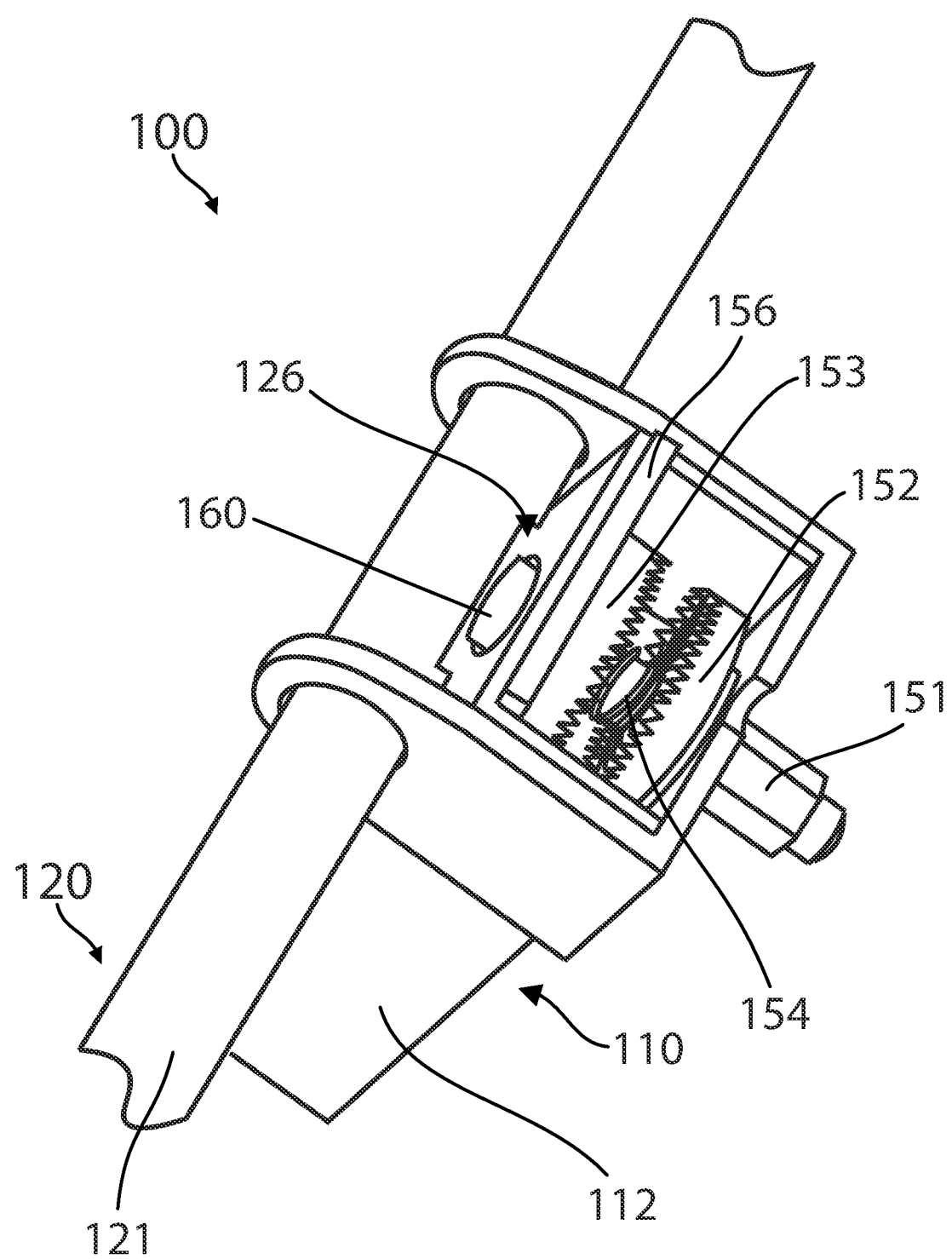
FIG. 8 is an elevated perspective view of a lockable pallet securement apparatus of an embodiment of the pallet hold-down system without an adjustable pallet engagement member attached, illustrating a rotatable member in an unlocked position to show an elastic member between the first mating locking member and second mating locking member, and illustrating how an indent along a length of the rotatable member aligns and contacts with a second end of a positioning member of a locking mechanism.

FIG. 8 is an elevated perspective view of the lockable pallet securement apparatus 112 of the embodiment of the pallet hold-down system 100 without the adjustable pallet engagement member 140 attached. The rotatable member 121 of the horizontal movement securement apparatus 120 is illustrated as broken on both sides. The rotatable member 121 is in the unlocked position. The locking mechanism 150 has the shaft 151, the first mating locking member 153 moveable along the shaft 151, the second mating locking member 152, the elastic member 154 positioned between the first mating locking member 153 and the second mating locking member 152, and the positioning member 159. The first mating locking member 153 and the second mating locking member 152 are gears in this embodiment. The elastic member 154 is a spring in this embodiment. The first mating locking member 153 is an assembly having the first mating locking member 153, the plate 156 having the first side 157 and the second side 158, and the positioning member 159. The positioning member 159 has the first end 161, the middle portion 162 and the second end 160 (all parts shown in FIG. 9). The first side 157 of the plate 156 is affixed to the first mating locking member 153. The second side 157 of the plate 156 is affixed to the first end 161 of the positioning member 159. The second end 160 of the positioning member 159 engages the rotatable member 121. The rotatable member 121 has the least one indent 126 along a length of the rotatable member 121. The at least one indent 126 align with the second end 160 of the positioning member 159. In the embodiment shown, there is a cradle around the assembly so the plate 156 and the affixed first mating locking member 153, and even the elastic member 154, do not fall off the shaft 151 when the second end 160 of the positioning member 159 is engaged to the indent 126. Any other means known in the art to prevent the assembly from coming off the shaft 151 can be used. The cradle has a hole that allows the second end 160 of the positioning member 159 to protrude beyond the cradle to allow contact with the indent 126 or non-indented portion of the rotatable member 121. The locking mechanism 150 in the embodiment in FIG. 8 otherwise works the same as that of FIG. 6 and FIG. 7.

Figure 9:
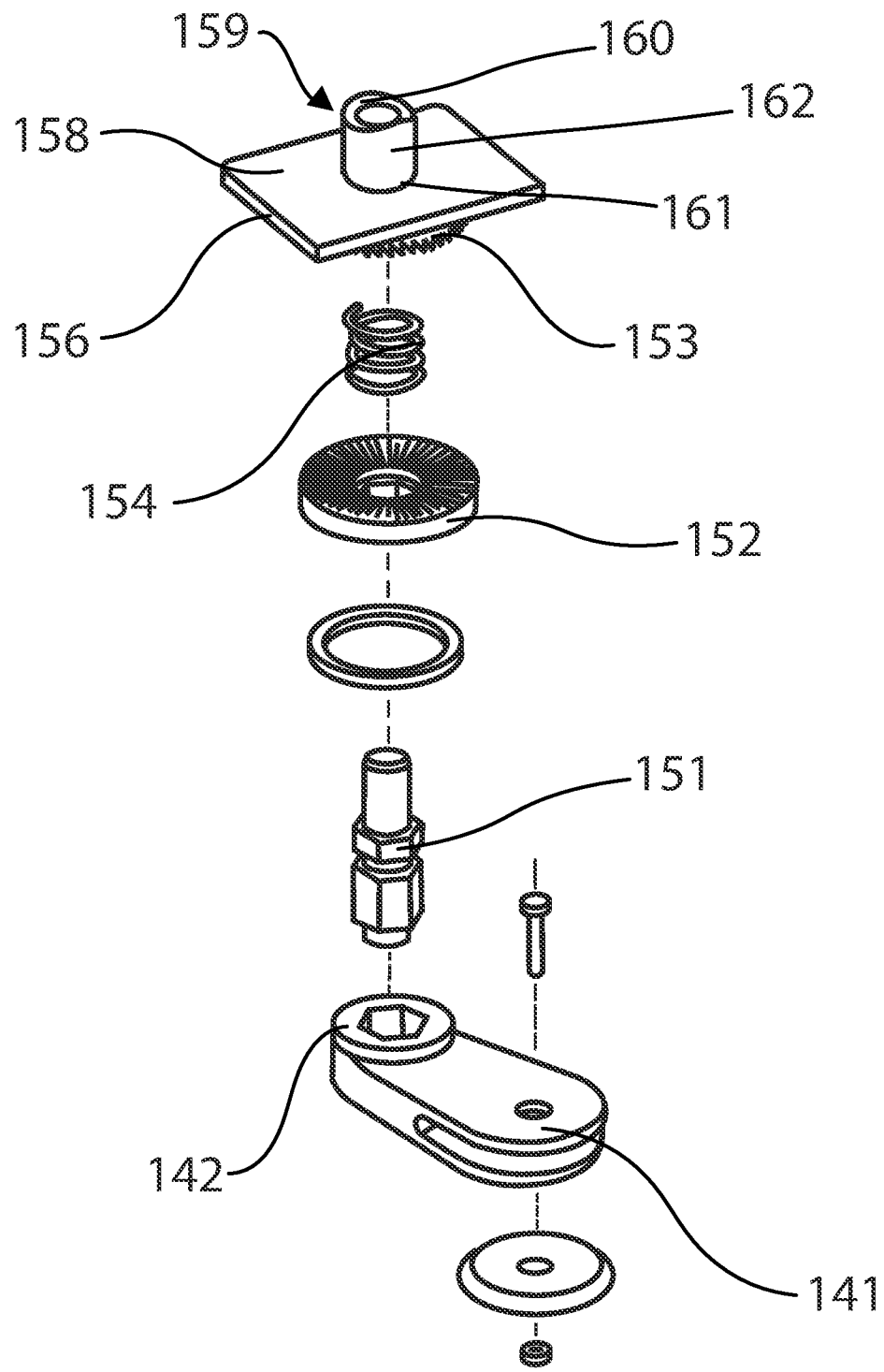
FIG. 9 is an exploded view of a locking mechanism and an adjustable pallet engagement member of an embodiment of the pallet hold-down system to illustrate how the locking mechanism and the adjustable pallet engagement member engage one another.

FIG. 9 is an exploded perspective view of the locking mechanism 150 and the adjustable pallet engagement member 140 of an embodiment of the pallet hold-down system 100. The locking mechanism 150 has the shaft 151, the assembly, the second mating locking member 152, the elastic member 154, and the positioning member 156. The gear assembly has the first mating locking member 153, the plate 156 having a first side 157 and a second side 158, and the positioning member 159. The positioning member 159 has a first end 161, a middle portion 162 and a second end 160 (all parts shown in FIG. 9). The first mating locking member 153 and the second mating locking member 152 are gears in this embodiment. The elastic member 154 is a spring in this embodiment. As shown in FIG. 9, the first mating locking member 153 is affixed to the first side 157 of the plate 156. The second side 157 of the plate 156 is affixed to the first end 161 of the positioning member 159. The second end 160 of the positioning member 159 can be clearly seen in FIG. 9, showing a concaved surface with a hollow middle. The second end 160 does not need to be concaved and can be of different shape that allows for the rotatable member 121 (not shown in FIG. 9) to rotate to align with either one of the at least one indent 123 (not shown in FIG. 9) or one of its non-indented portions. The first end 161 and the middle portion 162 of the positioning member 159 are also hollow, and the hollow is of a diameter that allows uninhibited sliding of the positioning member 159 on the shaft 151. The first mating locking member 153 has a hole in the middle that aligns with the hollow of the positioning member 159, to allow the entire assembly to slide along the shaft 151. The elastic member 154 resides in between the assembly and the second mating locking member 152. When the locking mechanism 150 is in the unlocked position, the elastic member 154 is not compressed by the gear assembly and the tension of the elastic member 154 keeps the gear assembly and the second mating locking member 152 apart. This allows the second mating locking member 152 to freely rotate along with the shaft 151. The second mating locking member 152 also has a hole to matingly fit the shaft 151, and the shaft 151 and the second mating locking member 152 are interconnected to rotate together when in the unlocked position. A washer can be placed between the shaft 151 and the second mating locking member 152. When the locking mechanism 150 is in locked position, the gear assembly pushes against the elastic member 154 until the elastic member 154 becomes fully compressed, causing the first mating locking member 153 and the second mating locking member 152 to lock together to prevent rotation of the second mating locking member 152 and the shaft 151.

The adjustable pallet engagement member 140 has the first end 141 that engages an upper surface of the pallet (shown in FIG. 10) and the rotatable second end 142 that engages the locking mechanism 150. The head of the shaft 151 matingly connects with the second rotatable end 142 of the adjustable pallet engagement member 140, allowing the adjustable pallet engagement member 140 to rotate when the shaft 151 rotates, which allows the adjustable pallet engagement member 140 to adjust for a thickness of a pallet inserted into the hold-down system 100 (Shown in FIG. 10). Locking of the shaft 151 also locks the adjustable pallet engagement member 140, securing and preventing a vertical movement of a pallet inserted into the bay (Shown in FIG. 10). Therefore, the locking mechanism 150 is interconnected to the adjustable pallet engagement member 140 through the shaft 151. The first end 141 of the adjustable pallet engagement member 140 is for pallet engagement and adjustment to the pallet thickness. The first end 141 can be made of material that allows for shock absorption. The first end 141 can be made of non-slip material to hold the locked pallet in place, such as rubber. The first end 141 can have a rotatable disc. A pin and nut can be used to hold the rotatable disc in place within the first end 141 of the adjustable pallet engagement member 140. Any other means known in the art may be used to affix the rotatable disc to the first end 141 of the adjustable pallet engagement member 140.

Figure 10:
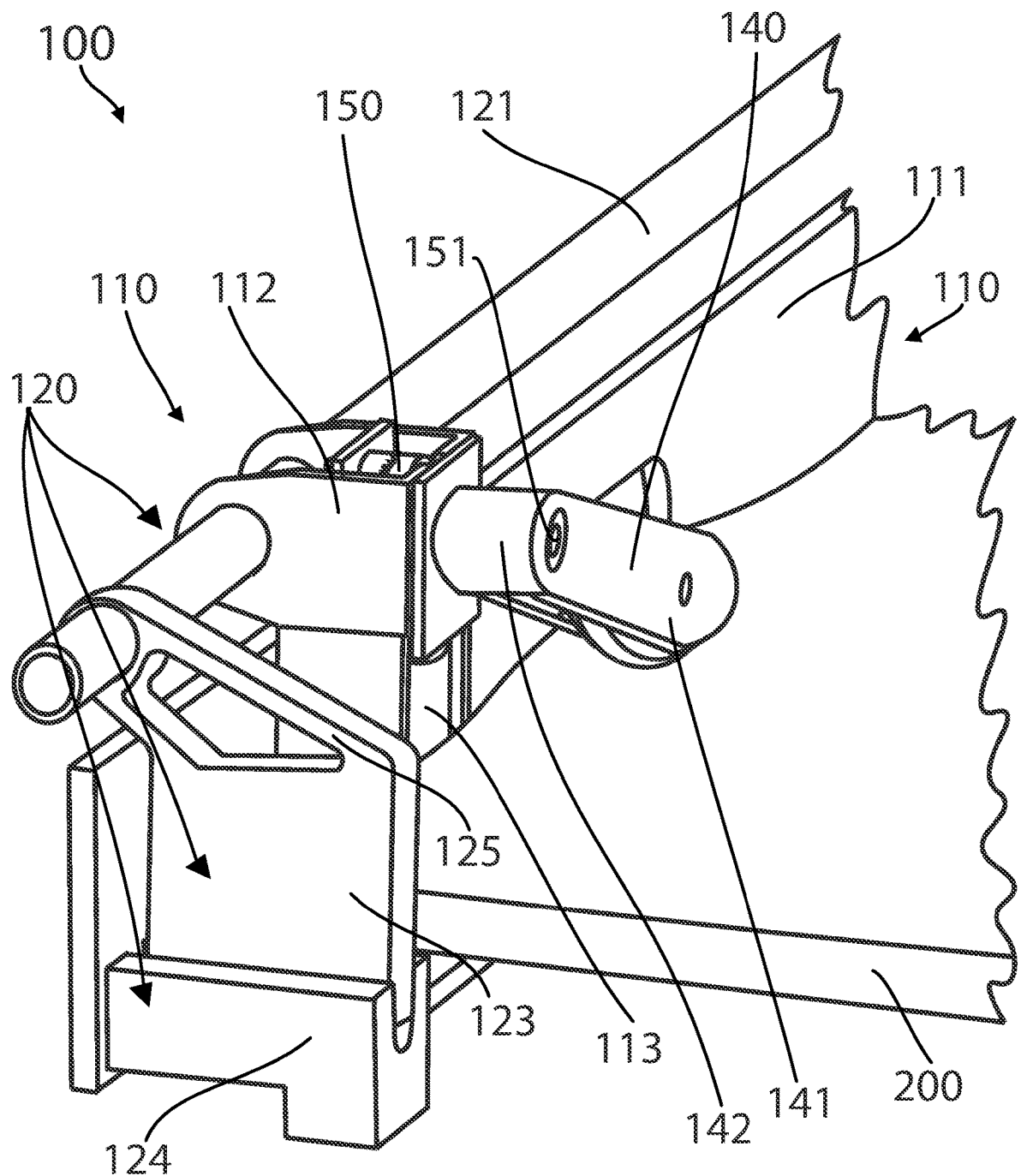
FIG. 10 is a perspective view of an embodiment of the pallet hold-down system illustrating a stopping member in a locked position, with a misshaped pallet inserted into the pallet hold-down system, to show how an adjustable pallet engagement member adjusts to a thickness of the pallet and secures the pallet.

FIG. 10 is a perspective view of an embodiment of the pallet hold-down system 100 in use with a misshaped pallet 200. The back portion of the vertical movement securement apparatus 110, the horizontal movement securement apparatus 120, and the pallet 200 are illustrated as broken towards the back (right side of the page). All components of the pallet hold-down system 100 function the same as described in previous FIGS and the descriptions will not be repeated. The misshaped pallet is 200 inserted into the space between the pair of a parallel securement members 111 (only left component in shown in FIG. 10) of the vertical movement securement apparatus 110. The pallet alignment member 113, here shown as a rotatable bumper, facilitates pallet movement and positioning. The pallet alignment member 113 can be shock absorbent and serves to cushion the pallet 200 as it is inserted into the bay. The first end 141 of the adjustable pallet engagement member 140 engages the upper surface of the pallet 200 as the pallet 200 is inserted. The first end 141 of the adjustable pallet engagement member 140 moves to adjust for the various thicknesses of the misshaped pallet 200 along its surface by rotating on the rotatable second end 142 that is connected to the shaft 151 of the locking mechanism 150. Here, the first end has a rotatable disc. Once the pallet 200 is fully inserted into the pallet hold-down system 100, a stopping member of the horizontal movement securement apparatus 120 is placed into a locked condition by rotating the block 123 into the cradle 124, which stops the block 123 from further rotation and locks the block 123 in place, the block 123 preventing horizontal movement of the pallet 200. The block 123 is connected to the rotatable member 121 by the upper member 125. The rotating of the block 123 also rotates the rotatable member 121, causing the non-indented portion of the length of the rotatable member 121 to engage the locking mechanism 150 as described previously, which locks the shaft 151 and the rotatable second end 142 of the adjustable pallet engagement member 140, causing the first end 141 to push down on the upper surface of the pallet 200 to secure the pallet 200 and prevent vertical movement. The pallet 200 is therefore fully secured both vertically and horizontally within the airplane bay. The pallet hold-down system 100 can accommodate a wide variety of pallet sizes and thicknesses by the use of the at least one adjustable pallet engagement member 140.

Figure 11:
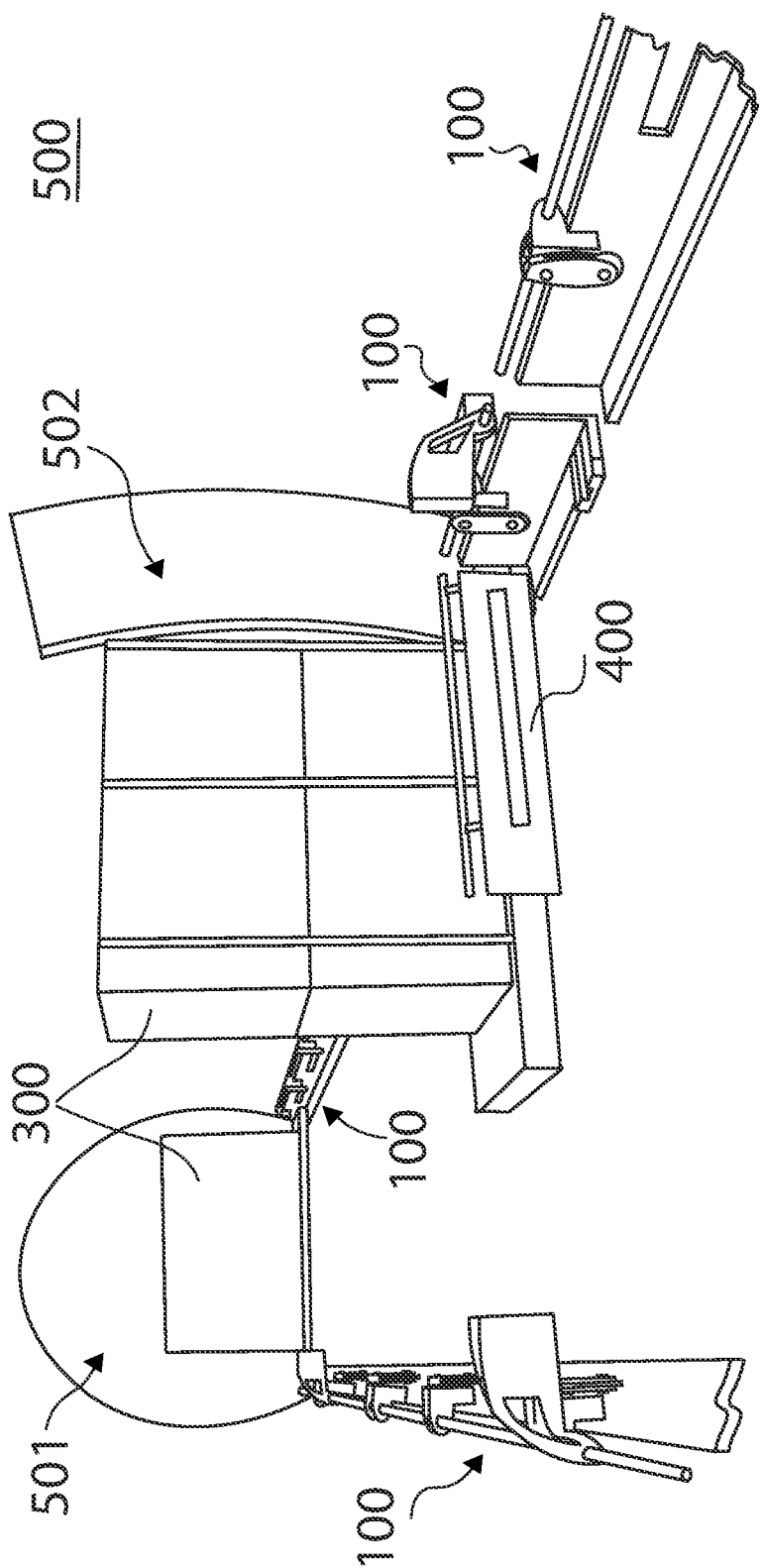
FIG. 11 is a perspective view of a passenger bay of an airplane, illustrating how an embodiment of the pallet hold-down system can be installed to turn a passenger bay into a cargo bay, and how palletized cargos can be loaded from a side door.
Figure 12:
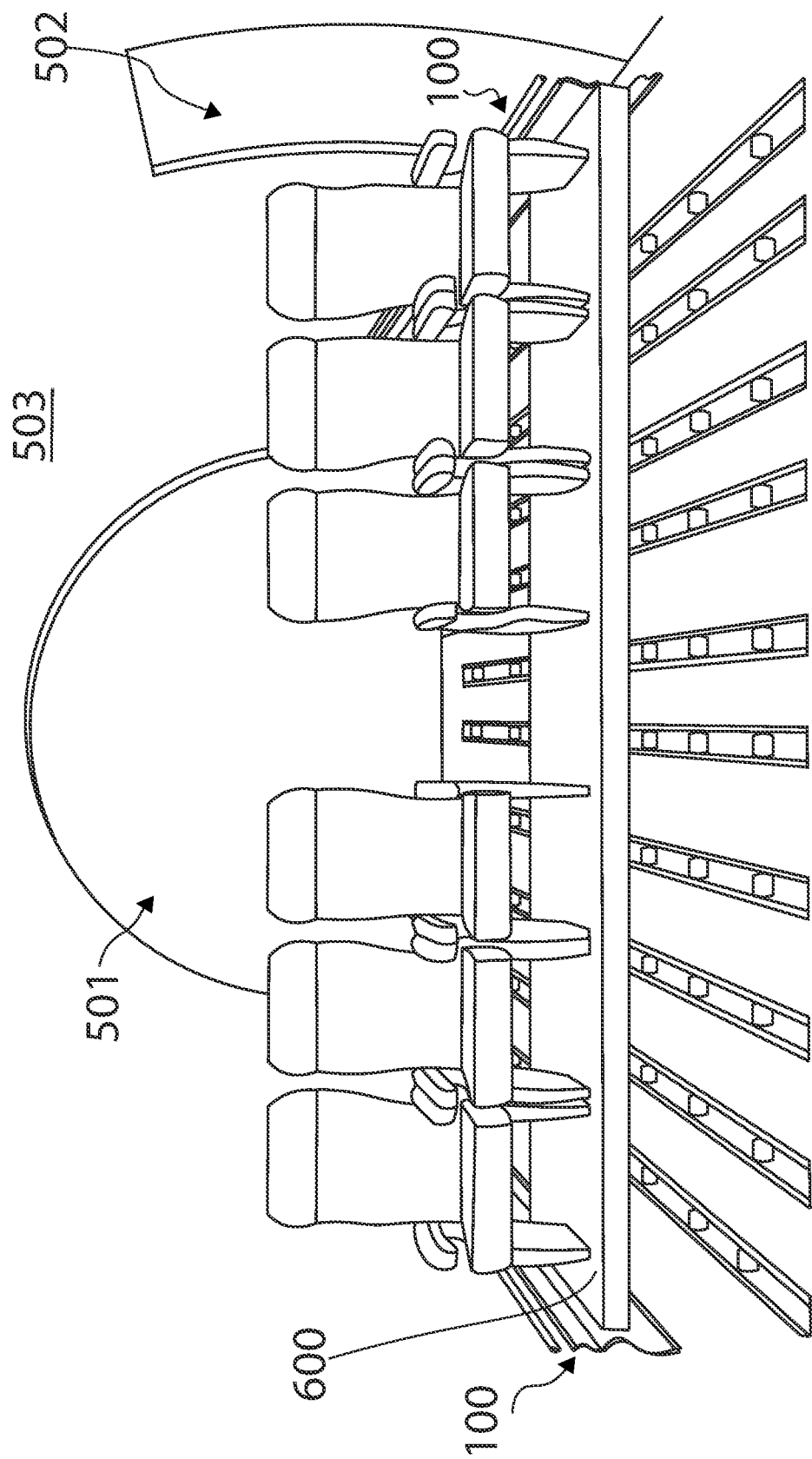
FIG. 12 is a front view of a cargo bay of an airplane, illustrating how an embodiment of the pallet hold-down system can be installed to turn a cargo bay into a passenger bay.

FIG. 11 is a perspective view of an airplane passenger bay 500 within an airplane, illustrating how an embodiment of the pallet hold-down system 100 can be installed to accommodate palletized cargos 300 loaded from a side door 502. This door could be any type of door but is typically used for passengers. For FIG. 11 and FIG. 12, the components of the pallet hold-down system 100 are not illustrated in detail and not individually marked since the components were described in great detail above. The same numbering as previous FIGS applies. No load carrying floor rollers (Shown in FIG. 12) are illustrated in FIG. 11, but they may be installed if desired. A portion of the pair of the parallel securement members can be designed to serve as a side door 400. This will allow for loading and unloading of pallets 200 from the side passenger door 502. Any means known in the art to design a door can be used, such as a hinge. FIG. 12 is a perspective view of an airplane cargo bay 503 within an airplane, illustrating how an embodiment of the pallet hold-down system 100 can be installed to accommodate palletized seats 600 loaded from a cargo door 501. Existing load carrying floor rollers that facilitate pallet movement within the cargo bay 503 need not be changed. However, if used within the passenger bay 500, the load carrying floor rollers can be installed onto the bay floor.

The apparatus described above can also be described and used in a method of loading a plane. A method for using an embodiment of the pallet hold-down system to secure at least one pallet is provided: installing a vertical movement securement apparatus by installing a pair of parallel securement apparatuses to a base, and installing a plurality of lockable pallet securement apparatuses to the pair of parallel securement apparatuses where the plurality of lockable pallet securement apparatuses engage an upper surface of the at least one pallet and can be alternated between an unlocked and a locked condition; installing a horizontal movement securement apparatus by installing a rotatable member, and installing at least one stopping member affixed to at least one end of the rotatable member; interconnecting the vertical movement securement apparatus and the horizontal movement securement apparatus via the rotatable member; unlocking both the vertical movement securement apparatus and the horizontal movement securement apparatus by rotating the rotatable member to the first position; and locking both the vertical movement securement apparatus and the horizontal movement securement apparatus by rotating the rotatable member to the second position.

Additionally, the vertical movement locking steps are provided: using the vertical movement securement apparatus; loading and aligning at least one pallet using said pallet aligners; contacting an upper surface of the at least one pallet with the contact member of the first end of each of the at least one adjustable and lockable pallet securement apparatus; Rotating the second rotatable end of each of the at least one adjustable and lockable pallet securement apparatus to conform the first end to the pallet upper surface; Locking the at least one pallet into place using the locking mechanism by rotating the rotatable member, switching between the plurality of first contacting points to the plurality of second contacting points along the length of the rotatable member, at the plurality of second contacting points, urging the first mating locking apparatus against the elastic member, compressing the elastic member, and forcing the first mating locking apparatus to engage and lock with the second mating locking apparatus.

Additionally, the horizontal movement locking steps are provided: using the horizontal movement securement apparatus; loading at least one pallet until a trailing end of the at least one pallet is past the horizontal movement locking apparatus; locking the at least one pallet into place by rotating the rotatable member and the at least one stop block; urging the at least one stop block into the at least one stop block cradle; locking the at least one stop block into the at least one stop block cradle; and preventing the at least one pallet horizontal movement by blocking at least the trailing end of the at least one pallet with the at least one stop block. Pallets can also be loaded into an airplane, having the steps of: having at least one smaller pallet; opening an airplane side door; loading the at least one smaller pallet through the airplane side door; sliding and positioning the at least one smaller pallet into position within the airplane; and locking the at least one smaller pallet into place. There also can be an additional step of having an alarm system to automatically check if the hold-down system is in a locked or unlocked position and generating a warning if the pallet hold-down system is not in the appropriate position. Palletized seats can be loaded with an additional step of affixing seats to the short pallet and loading the pallet through the side passenger door. This makes it extremely easy to convert a passenger plane to a cargo plane and back. It also makes it extremely easy to change the types or styles of seats in the aircraft. There is no longer a need to undo each seat and remove them one by one. With this system entire rows of seats can be replaced with ease.

A method for quickly converting a plane passenger compartment to a cargo compartment using a pallet hold-down system for an airplane bay is also provided: rotating a rotatable horizontal movement stopping member affixed to a rotatable member from a locked position to an open position, thereby unlocking the stopping member and unlocking a plurality of lockable pallet securement apparatuses that previously secured palletized seats to a pair of parallel securement members affixed to a floor of the airplane bay; removing the palletized seats through a side passenger loading door; inserting smaller, pre-palletized cargo through the side passenger loading door; rolling smaller pallets along a series of floor rollers wherein tops of the pallets are guided under a rotatable disc at a bottom of the plurality of lockable pallet securement apparatuses and into position within said passenger bay until passenger bay is full; and rotating the stopping member into the locked position once all pallets are in place, thereby simultaneously locking the plurality of lockable pallet securement apparatuses and thus securing cargo both vertically and horizontally.

This is a very easy system to operate and to lock down. But because it is so easy to operate there is a possibility that the operator may forget to lock down the system. The present invention provides a variety of ways to address this issue. The first way is to have an alarm (not illustrated) that will notify the user or operator when the pallet hold-down system is not properly set in the locked condition. This alarm can be set to alert the operator when any of a variety of faults arise. Such as not having the stop member in the locked position or having the stopping member not fully in the locked position. This alarm can be set to alert the operator when the doors are closing but before the operator leaves the craft. The system to rotate the block of the stopping member can be entirely manual, such that the operator has to physically reach down and rotate the block of the stopping member. However, it could be entirely electronically controlled, using a microswitch and motors to move the block of the stopping member up or down and into the locked position or out of the locked position. Again, there could be an alarm incorporated therein and this alarm could utilize a microswitch with alarm circuitry.

This pallet hold-down system also has the unique ability to easily handle different sized pallets and different types of pallets that are unique to this disclosure. In the prior art it is difficult to tie down different sized pallets due to the layout and configuration. However, with the present invention it is easy to load full sized and shorter pallets alike. Additionally, because the prior art is only applicable to full sized pallets it is understood that these pallets must be loaded through a large cargo door. This does not hold true with the present invention. The pallet hold-down system of the current invention is able to receive and secure pallets of differing size, including smaller pallets that can be loaded through the side passenger door. In this pallet hold-down system, it is possible to use the passenger bay as an additional cargo bay. This is accomplished because the pallet hold-down system can accept smaller pallets that can be loaded into the airplane passenger bay through the existing side passenger doors. There is no door retrofit required. This unique attribute makes it extremely easy to convert a passenger compartment into a cargo compartment. There is some modification that must be done, but once accomplished it is extremely easy to swap seats for cargo.

The smaller pallets of this pallet hold-down system is as wide as the aircraft bay, but are shorter in length so that they will fit through the side passenger door. The pallets also are interconnectable so that they can be easily locked together, one to another. This lockability is accomplished by using some sort of interconnecting apparatus, such as tongue and groove connection, or interlocking pins, or tabs, or any other apparatus that can connect one small pallet to the next. Preferably these connectors have a way to lock together so that the pallets can be secured one to the other. This lockability creates a stronger pallet and also minimizes overall pallet motion once secured within the bay. This lockability could be tied to the stopping member so that when the block is lowered it activates locking members between the pallets resulting in the pallets locking together. This could be electronically activated or it could be a mechanical system, such as lock bars, or locking pins or some other mechanical means to lock the pallets one to the other. Having these smaller pallets also provides for a wider cargo loading ability, including the ability to preload pallets with passenger seats that are easily installed and removed from the passenger bay.

The ability to swap seats for cargo is created by pre-palletizing seats. To accomplish this, the above described pallets that are only as wide as the passenger door are utilized so that they can be loaded through the passenger door. These pallets are then used as the base for seating. These pallets can be carpeted and configured with whatever type of seat is desired. Once the carpeting and seats are secured to the pallets, the pallets can be quickly and easily loaded into the passenger bay through the existing passenger door. Once loaded they can be interconnected and locked together. If the plane needs to be converted to a cargo plane configuration then the palletized seats are simply removed through the same passenger door and the cargo loaded pallets are inserted through the same passenger door and into the passenger bay.

As noted above, previously, both the side lipped slots and pallet outboard edges had to be within 0.25 of an inch of flat to ensure positive vertical contact necessary to restrain the pallet from vertical motion and to enable the outboard edges to slide within the lipped slots as the pallet is secured. Now, the industry wide requirement for system compliance to accommodate pallet distortion is up to 1.75". This is much larger than previously specified and the invention described herein accommodates this now recognized pallet distortion dimension. One important note regarding this enlarged standard is that the adjustable pallet engagement members now must be of greater strength to accommodate the extra margins. This means that the adjustable pallet engagement members must be stronger, the locking members must be stronger, and the stopping member must be stronger. All are accomplished with the present invention.

As mentioned, this system can be used with smaller sized doors, such as the passenger bay doors. The present invention provides a way, system and method to easily convert an existing passenger plane passenger bay, or existing cargo bay, into the current system. This description given above details how easy it is to simply remove the existing securement system and install the current system, one that allows for greater flexibility and greater security. Because of the adjustable pallet engagement member configuration, it is possible to use them with even severely deformed or misshaped pallets. The system, as noted above, is also capable of receiving shorter or different sized pallets and this flexibility allows for the ability to load pallets through a smaller entry door, such as the side passenger door. And of course, as set out above, these smaller pallets could come preconfigured with seating already affixed and secured to the pallet. These shorter pallets can also be designed with interconnecting locking mechanisms that allows the smaller pallets to be locked one to the other, thus creating a full-sized larger pallet. It is also possible to lock these smaller pallets together and simply use as a larger sized pallet if desired or required. Loading and offloading seats takes a matter of minutes rather than hours, thus saving airlines countless man hours and expense.

Using the present invention, users are able to quickly convert a plane's passenger compartment to cargo compartment and back again. An added advantage is that it could be possible to easily change out seats. For example, if a plane is sold to another airline and the new airline desires different colored seats or a different style of seat, they could purchase the new seats from a maker that utilizes the same securement system and could change out the entire seating within a matter of minutes. The method was described above. This is quick, requires few if any tools, requires little training and once planes are converted it allows for planes to quickly be converted from cargo to passenger and back again if needed.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by letters patent includes the following.

What is claimed is:

1. A pallet hold-down system comprising:
   a vertical movement securement apparatus comprising:
      at least a pair of parallel securement members securable to a base;
      a plurality of lockable pallet securement apparatuses affixed to said securement members, each of said lockable pallet securement apparatuses comprising:
         at least one pallet alignment member to facilitate pallet movement and positioning;
         at least one adjustable pallet engagement member that can adjust for pallet thicknesses; and
         a locking mechanism to lock and prevent movement of said at least one adjustable pallet engagement member;
   a horizontal movement securement apparatus comprising:
      a rotatable member;
      at least one stopping member affixed to at least one end of said rotatable member where said at least one stopping member is rotatable into a stopping condition to prevent horizontal pallet movement; and
      where said rotatable member is interconnected with said vertical movement securement apparatus such that rotation of said rotatable member simultaneously locks both said vertical movement securement apparatus and said horizontal movement securement apparatus.

2. The pallet hold-down system of claim 1, said at least one adjustable pallet engagement member comprising:
   a first end;
   a second rotatable end; where
      said first end engages an upper surface of said pallet;
      said second end engages said locking mechanism; and
      said locking mechanism can lock or unlock said at least one adjustable pallet engagement member.

3. The pallet hold-down system of claim 2, said locking mechanism further comprising:
   a shaft;
   a first mating locking member moveable along said shaft;
   a second mating locking member engaged to said shaft and rotatable;
   an elastic member positioned between said first mating locking member and said second mating locking member; and
   a positioning member.

4. The pallet hold-down system of claim 3, where said first mating locking member comprising:
   a plate having a first side and a second side; and
said positioning member comprises:
   a first end;
   a middle portion; and a second end; where
said plate first side is affixed to said first mating locking member;
said plate second side is affixed to said positioning member first end; and
said positioning member second end engages said rotatable member.

5. The pallet hold-down system of claim 4, said rotatable member further comprises:
at least one indent along a length of said rotatable member;
said at least one indent is aligned with said positioning member second end;
when said rotatable member is rotated and said positioning member second end contacts said at least one indent, said locking mechanism is in said unlocked position; and
when said second end is not contacting said at least one indent, said locking mechanism is in a locked position.

6. The pallet hold-down system of claim 5, said horizontal movement securement apparatus further comprises:
an upper member connectable to said rotatable member;
a block affixed to said upper member; and
a cradle; where
when said block is in the locked condition said block is rotated into said cradle; and
when said block is in the unlocked condition, said block is rotated up and out of said cradle.

7. A pallet hold-down system comprising:
a vertical movement securement apparatus comprising:
at least a pair of parallel system securement apparatuses;
a plurality of lockable pallet securement apparatuses affixed to said at least a pair of parallel system securement apparatuses, each of said plurality of lockable pallet securement apparatuses comprising:
at least one pallet aligner;
at least one adjustable and lockable pallet securement apparatus, each of said at least one lockable pallet securement apparatus further comprising:
a shaft;
a first end having a contact member for contacting an upper surface of at least one pallet; and
a second rotatable end connectable to said shaft;
a locking mechanism to lock and unlock each of said lockable pallet securement apparatus, said locking mechanism comprising:
a first mating locking apparatus;
a second mating locking apparatus;
an elastic member positioned between said first mating locking apparatus and said second mating locking apparatus; and
an elongated contacting member;
a rotatable member comprising:
a plurality of first and second contact points along a length and circumference of said rotatable member and positioned in line with said elongated contacting member; where
when rotating said rotatable member to a first position, said plurality of first contact points meet with said elongated contacting member to disengage said first and said second mating locking apparatuses; and
when rotating said rotatable member to a second position, said plurality of second contact points engage with said elongated contacting member and push and compress said elastic member until said second mating locking apparatus engages and locks to said first mating locking apparatus.

8. The pallet hold-down system of claim 7, having a horizontal movement securement apparatus comprising:
at least one stop block attached to at least one end of said rotatable member; and
at least one stop block cradle.

9. The pallet hold-down system of claim 8, where said at least one adjustable and lockable pallet securement apparatus is rotatable and can receive and secure said at least one pallet of varying thickness.

10. The pallet hold-down system of claim 9, where said pallet hold-down system is used in an airplane passenger bay and said pallet hold-down system is-can receive and load the at least one pallet of varying thickness through the airplane passenger bay side door.

11. The pallet hold-down system of claim 10, wherein the at least one pallet of varying thickness comprises rows of seats.

12. A method of securing at least one pallet of varying thickness using the pallet hold-down system of claim 8, comprising the steps of:
Installing the vertical movement securement apparatus comprising the steps of:
installing the pair of parallel securement apparatuses to a base;
installing the plurality of lockable pallet securement apparatuses to said pair of parallel securement apparatuses where said plurality of lockable pallet securement apparatuses engage the upper surface of said at least one pallet and can be alternated between an unlocked and a locked condition;
installing the horizontal movement securement apparatus comprising the steps of:
installing the rotatable member; and
installing at least one stopping member affixed to the at least one end of said rotatable member where said stopping member is the stop block;
interconnecting said vertical movement securement apparatus and said horizontal movement securement apparatus via said rotatable member;
unlocking both said vertical movement securement apparatus and said horizontal movement securement apparatus by rotating said rotatable member to the first position; and
locking both vertical movement securement apparatus and said horizontal movement securement apparatus by rotating said rotatable member to the second position.

13. The method of claim 12, wherein locking the vertical movement securement apparatus further comprises the steps of:
loading and aligning at least one pallet using said pallet aligners;
contacting the upper surface of said at least one pallet with said first end pallet contact members;
rotating said second rotatable ends to conform said first end pallet contacting members to said pallet upper surface;
locking said at least one pallet into place using said locking mechanism, comprising the steps of:
rotating said rotatable member;
switching between said first contacting points to said second contacting points along said length of said rotatable member;
at said second contacting points:

urging said first mating locking apparatus against said elastic member;

compressing said elastic member;

forcing said first mating locking apparatus to engage and lock with said second mating locking apparatus.

14. The method of claim 13, wherein locking the horizontal movement securement apparatus further comprises the steps of:

loading the at least one pallet;
rotating said rotatable member and said at least one stop block;
urging said at least one stop block into said at least one stop block cradle;
locking said at least one stop block into said at least one stop block cradle; and
preventing horizontal movement of said at least one pallet by blocking at least a trailing end of said at least one pallet with said at least one stop block.

15. The method of claim 14 further comprising the steps of:

loading the at least one pallet into an airplane; where the at least one pallet of varying thickness is a smaller pallet;
opening the airplane passenger bay side door;
loading said smaller pallet through said side door;
sliding and positioning said smaller pallet into position within said airplane; and
locking said smaller pallet into the position.

* * * * *